(12) United States Patent
Yosida et al.

(10) Patent No.: US 9,944,169 B2
(45) Date of Patent: Apr. 17, 2018

(54) FUEL TANK FOR VEHICLE

(75) Inventors: Yuuichi Yosida, Tokyo (JP); Shuji Yamamoto, Tokyo (JP); Atsushi Seto, Tokyo (JP)

(73) Assignee: NIPPON STEEL & SUMITOMO METAL CORPORATION, Tokyo (JP)

( * ) Notice: Subject to any disclaimer, the term of this patent is extended or adjusted under 35 U.S.C. 154(b) by 608 days.

(21) Appl. No.: 13/823,676

(22) PCT Filed: Oct. 4, 2011

(86) PCT No.: PCT/JP2011/072878
§ 371 (c)(1),
(2), (4) Date: Mar. 14, 2013

(87) PCT Pub. No.: WO2012/046733
PCT Pub. Date: Apr. 12, 2012

(65) Prior Publication Data
US 2013/0168397 A1 Jul. 4, 2013

(30) Foreign Application Priority Data

Oct. 5, 2010 (JP) ................. 2010-225454

(51) Int. Cl.
*B60P 3/22* (2006.01)
*B60K 15/03* (2006.01)
(52) U.S. Cl.
CPC .... *B60K 15/03* (2013.01); *B60K 2015/03032* (2013.01); *B60K 2015/03105* (2013.01); *B60K 2015/03111* (2013.01)
(58) Field of Classification Search
CPC . B60P 3/221; B60P 3/24; B60K 15/03; B60K 57/077; B60T 17/06
(Continued)

(56) References Cited

U.S. PATENT DOCUMENTS 3,648,886 A * 3/1972 Pringle ............ B60K 15/03177
220/62.11
3,701,540 A * 10/1972 Pringle ................ B60K 15/067
280/834
(Continued)

FOREIGN PATENT DOCUMENTS

CN 100339248 C 9/2007
JP 3-96227 U 10/1991
(Continued)

OTHER PUBLICATIONS

International Preliminary Report on Patentability (Forms PCT/IB/338; PCT/IB/373 and PCT/ISA/237), dated May 16, 2013, issued in corresponding PCT International Application No. PCT/JP2011/072878.
(Continued)

*Primary Examiner* — Fenn C Mathew
*Assistant Examiner* — Cynthia Collado
(74) *Attorney, Agent, or Firm* — Birch, Stewart, Kolasch & Birch, LLP

(57) ABSTRACT

A fuel tank for a vehicle is formed of a tank main body in which an upper tank and a lower tank are mutually joined to form a closed space in which fuel is housed, and a sub-tank fixed to a bottom surface part of the lower tank by spot welding, in which a plurality of rows of the spot welding are set along a longitudinal direction of the lower tank with an interval therebetween in a width direction of the sub-tank, at least one bead positioned between the rows of the spot welding and extending continuously along the longitudinal direction of the lower tank is formed on the bottom surface part of the lower tank, and a lower surface of the sub-tank has no portion that is not brought into contact with the bottom surface part of the lower tank except for the bead.

7 Claims, 29 Drawing Sheets

(58) Field of Classification Search
USPC ......... 220/564, 562; 180/271, 274; 428/626, 428/632, 659; 280/834
See application file for complete search history.

(56) References Cited

U.S. PATENT DOCUMENTS

| | | | |
|---|---|---|---|
| 5,263,458 A | 11/1993 | Fujino et al. | |
| 5,496,069 A * | 3/1996 | Milligan | B60K 15/03 252/62 |
| 6,361,881 B1 | 3/2002 | Izaki et al. | |
| 6,604,598 B1 | 8/2003 | Rohde et al. | |
| 6,782,745 B1 * | 8/2004 | Zurek | G01F 1/684 73/204.12 |
| 2009/0053551 A1 | 2/2009 | Sakamoto et al. | |
| 2010/0109311 A1 * | 5/2010 | Yoshida | B60K 15/067 280/834 |
| 2016/0075227 A1 * | 3/2016 | Chan | B60K 15/03 220/562 |

FOREIGN PATENT DOCUMENTS

| | | | | |
|---|---|---|---|---|
| JP | 6-59117 | U | | 8/1994 |
| JP | 2515941 | Y2 | | 8/1996 |
| JP | 2515941 | Y | | 11/1996 |
| JP | 9-240295 | A | | 9/1997 |
| JP | 10-44793 | A | | 2/1998 |
| JP | 10-265967 | A | | 10/1998 |
| JP | 11-165544 | A | | 6/1999 |
| JP | 2000-158956 | A | | 6/2000 |
| JP | 2000158956 | A | * | 6/2000 |
| JP | 2002-67711 | A | | 3/2002 |
| JP | 2002-527659 | A | | 8/2002 |
| JP | 2002-321534 | A | | 11/2002 |
| JP | 2002-321537 | A | | 11/2002 |
| JP | 2002321534 | A | * | 11/2002 |
| JP | 2005199880 | A | * | 7/2005 |
| JP | 2005297820 | A | * | 10/2005 |
| JP | 2009-68102 | A | | 4/2009 |
| KR | 20-1998-007296 | U | | 4/1998 |
| WO | WO 9842972 | A1 | * | 10/1998 ............. B60K 15/03 |

OTHER PUBLICATIONS

Taiwanese Office Action, dated Dec. 26, 2013, for Taiwanese Application No. 100136049, including a partial English Summary thereof.
Japanese Office Action dated Mar. 18, 2014, issued in corresponding Japanese Patent Application No. 2013-132357.
Korean Office Action dated Apr. 29, 2014, issued in corresponding Korean Patent Application No. 10-2013-7008428.
International Search Report, dated Dec. 13, 2011, issued in corresponding PCT International Application No. PCT/JP2011/072878.
Written Opinion of the International Searching Authority, dated Dec. 13, 2011, issued in corresponding PCT International Application No. PCT/JP2011/072878.

* cited by examiner

F I G. 1
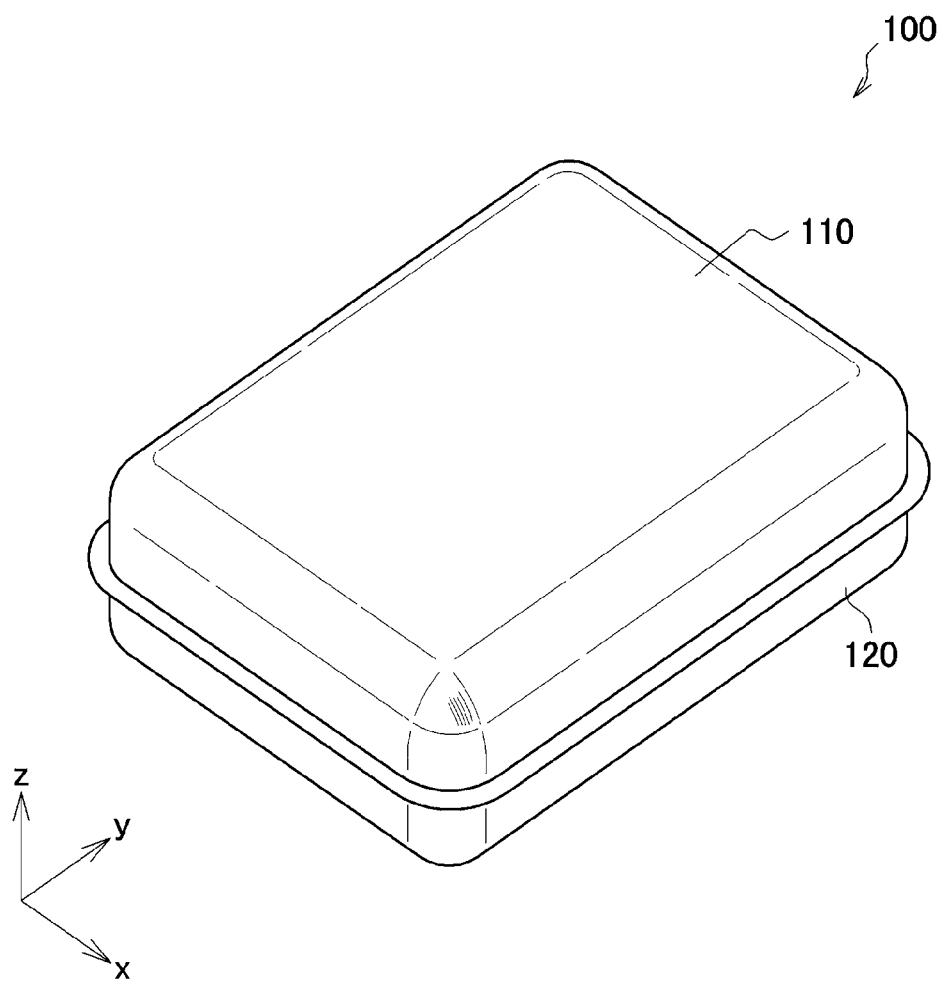

F I G. 2
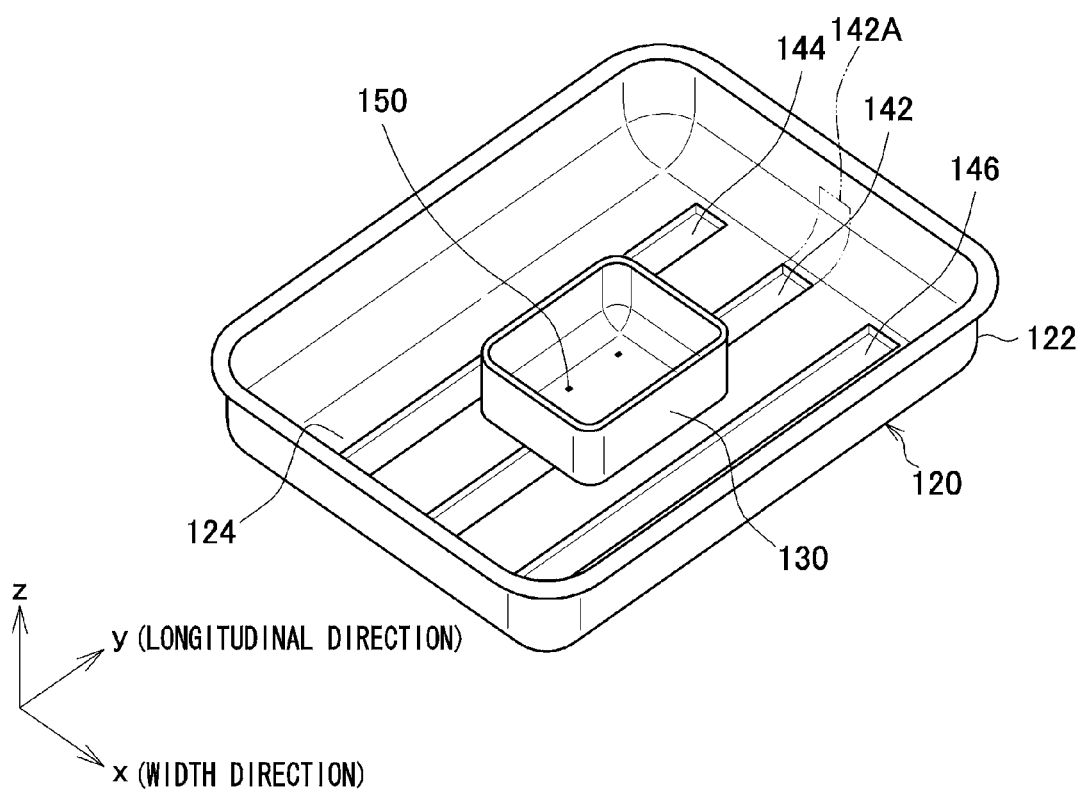

F I G. 4
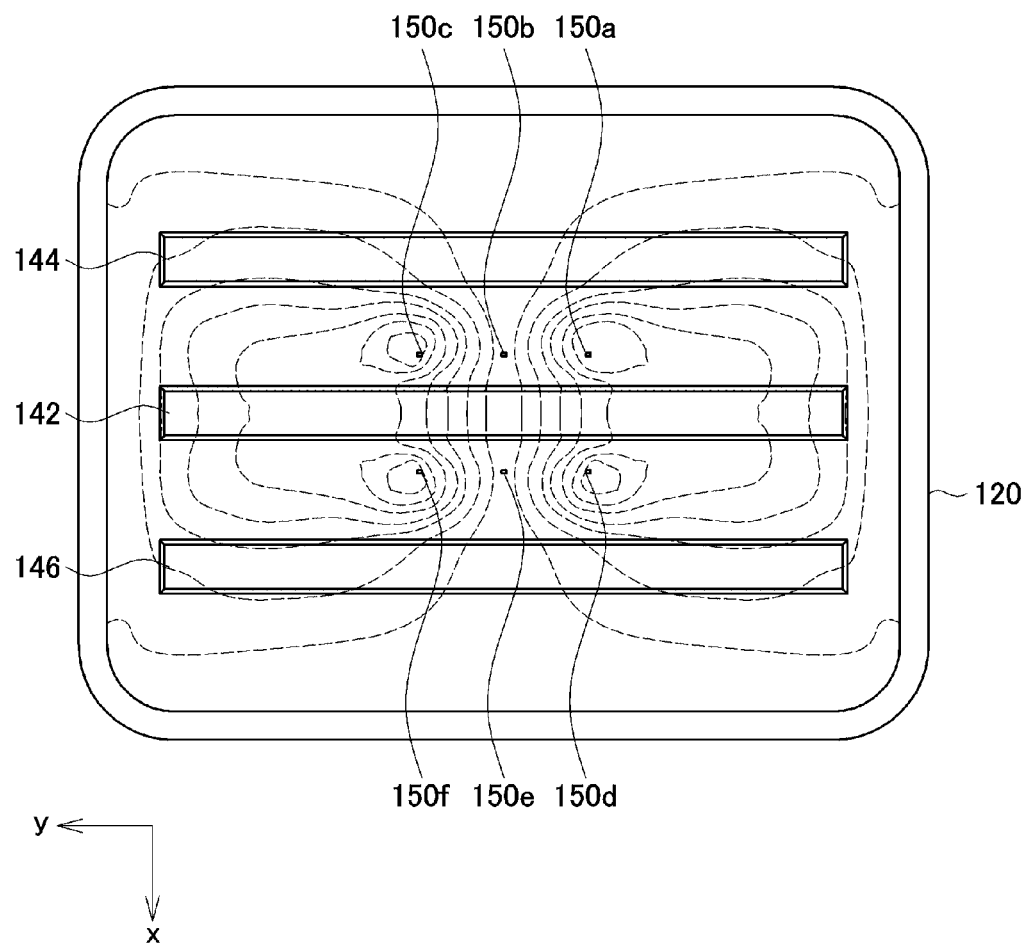

F I G. 5
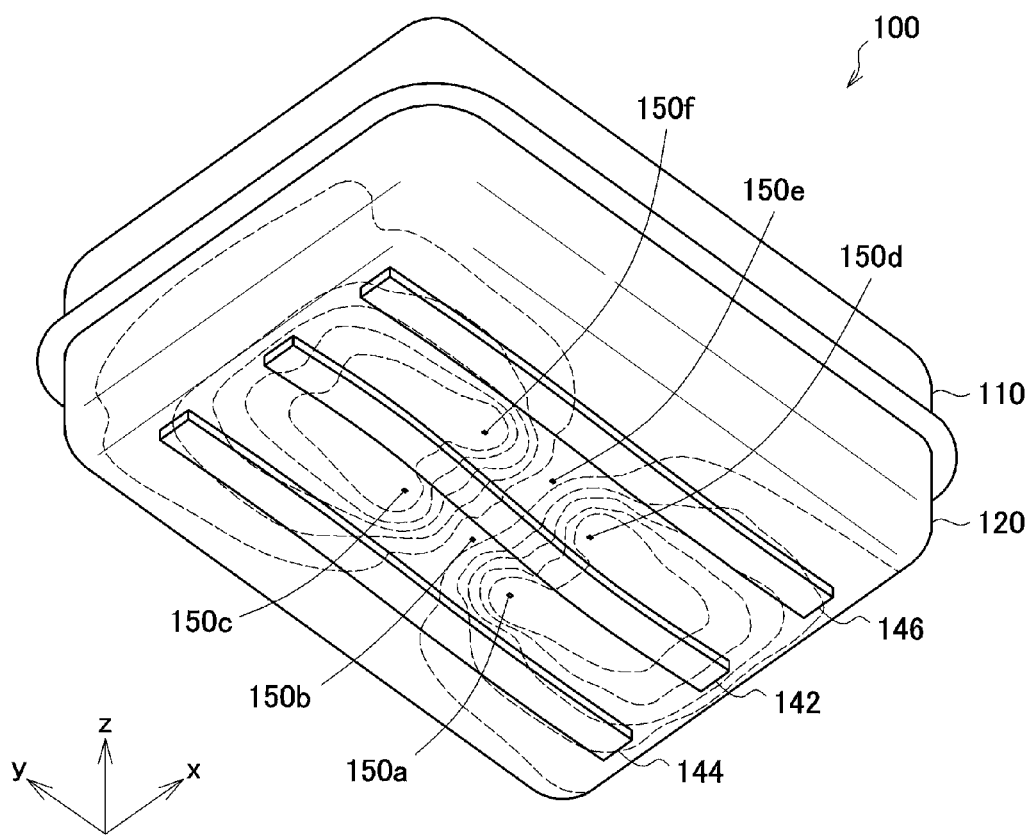

F I G. 6
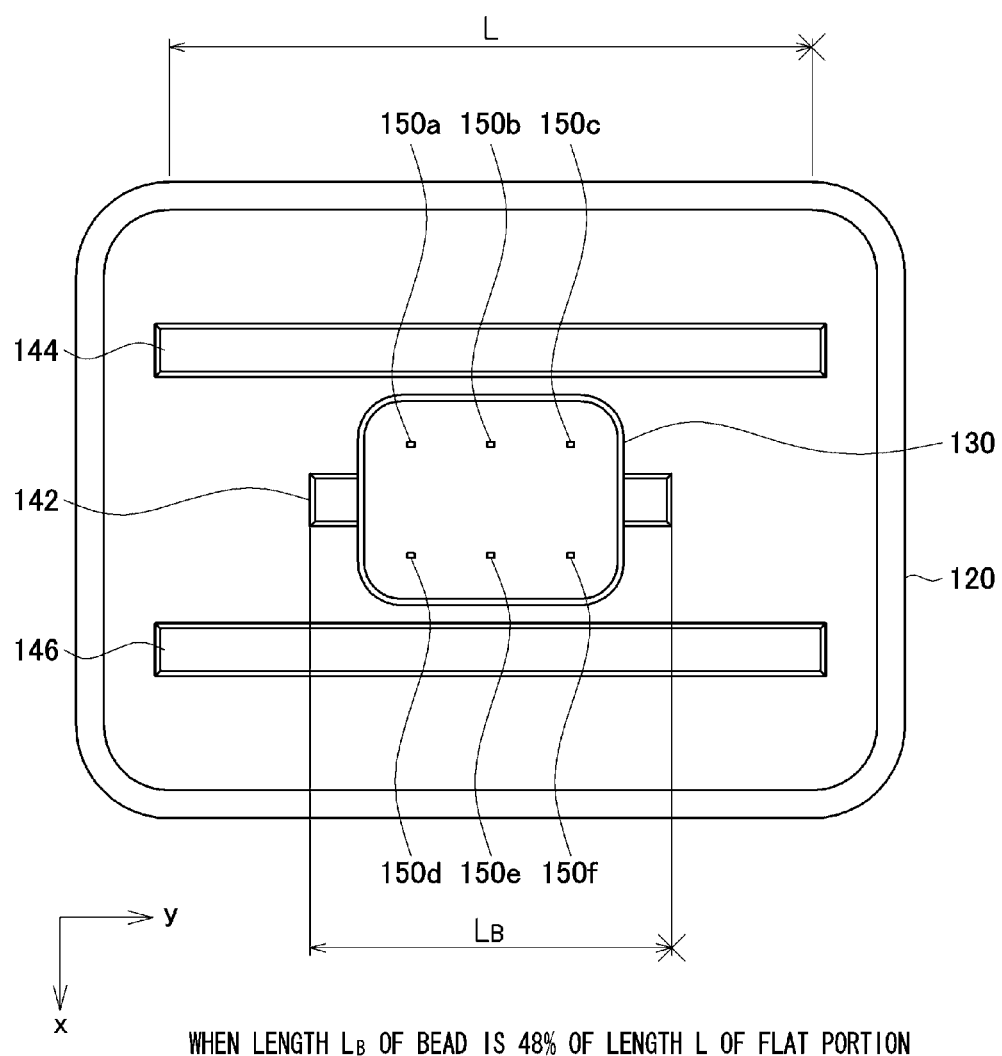
WHEN LENGTH L$_B$ OF BEAD IS 48% OF LENGTH L OF FLAT PORTION

F I G. 7
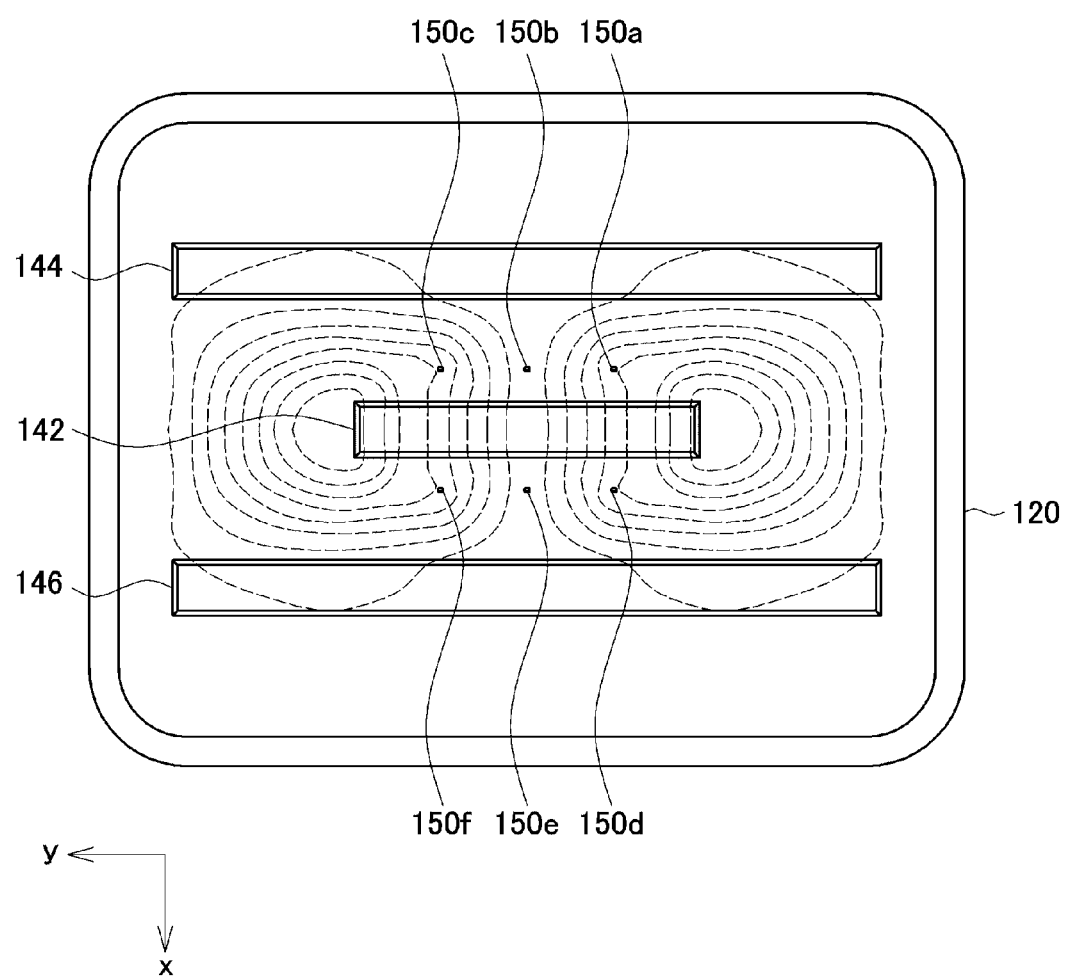

F I G. 8
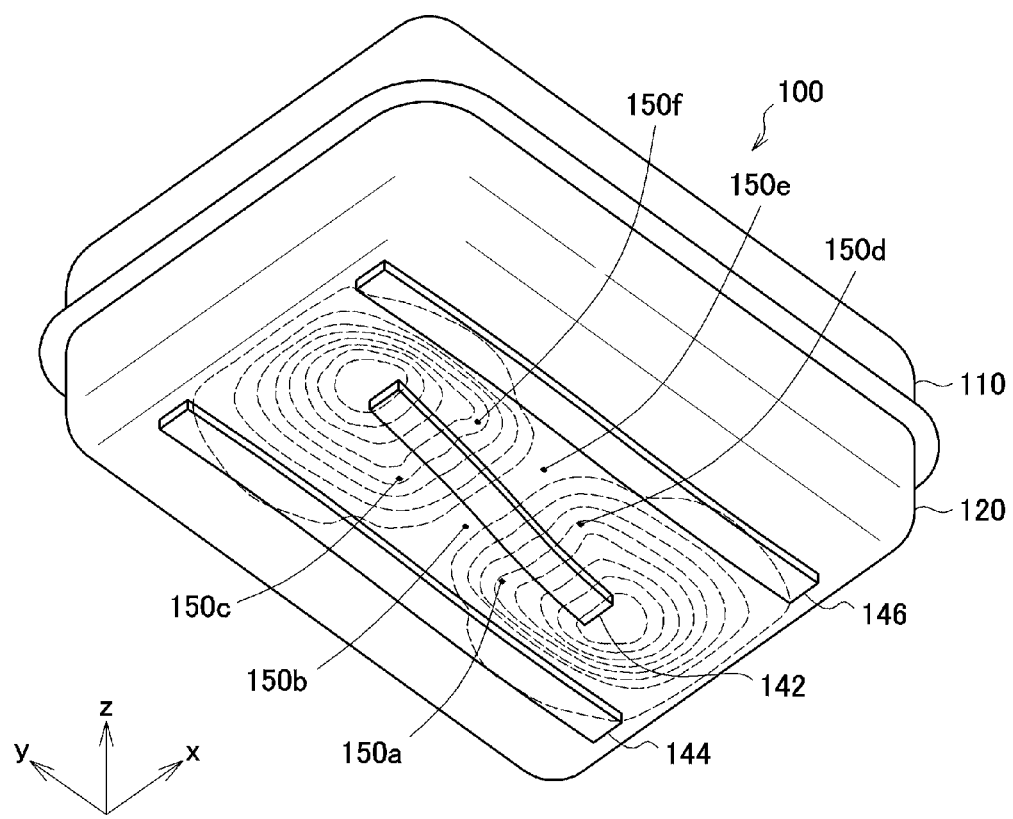

WHEN BEAD WIDTH $W_B$ IS 66% OF SPOT WELDING INTERVAL $W_S$

F I G. 10
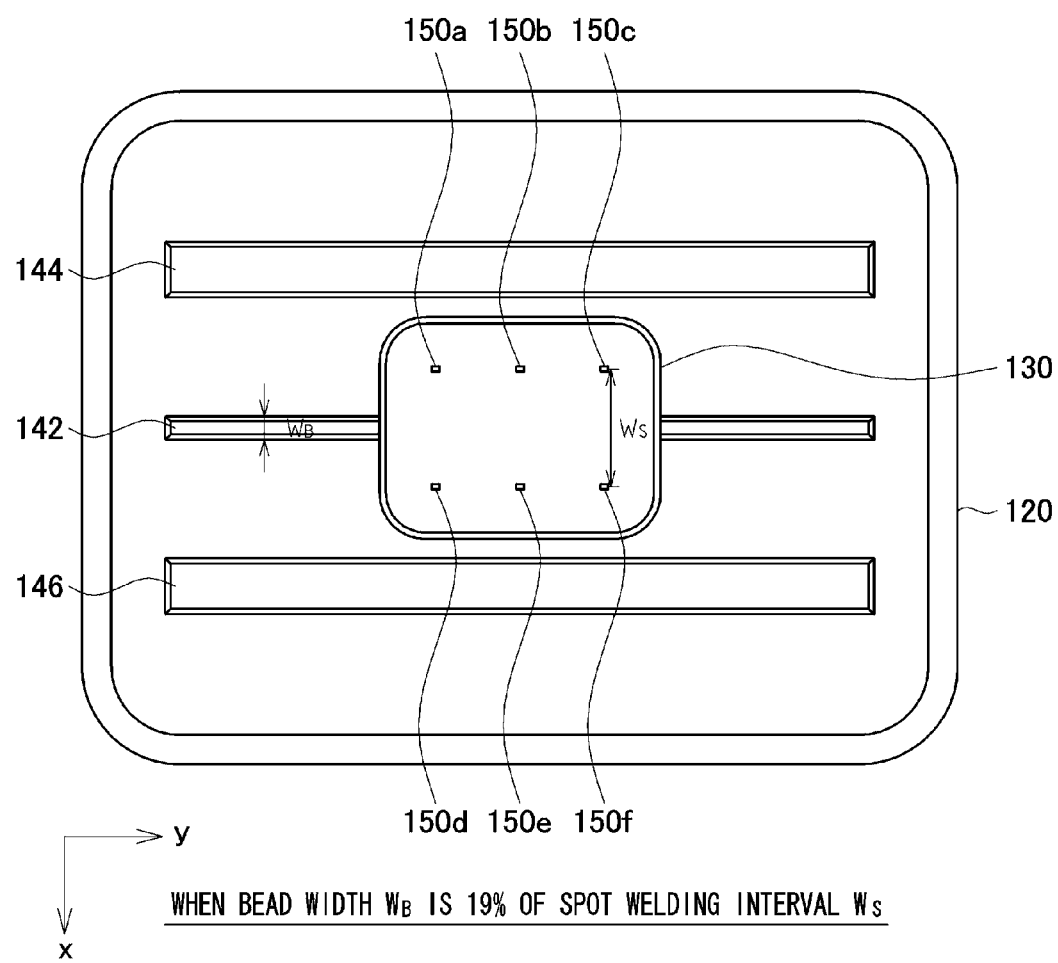
WHEN BEAD WIDTH $W_B$ IS 19% OF SPOT WELDING INTERVAL $W_S$ F I G. 11
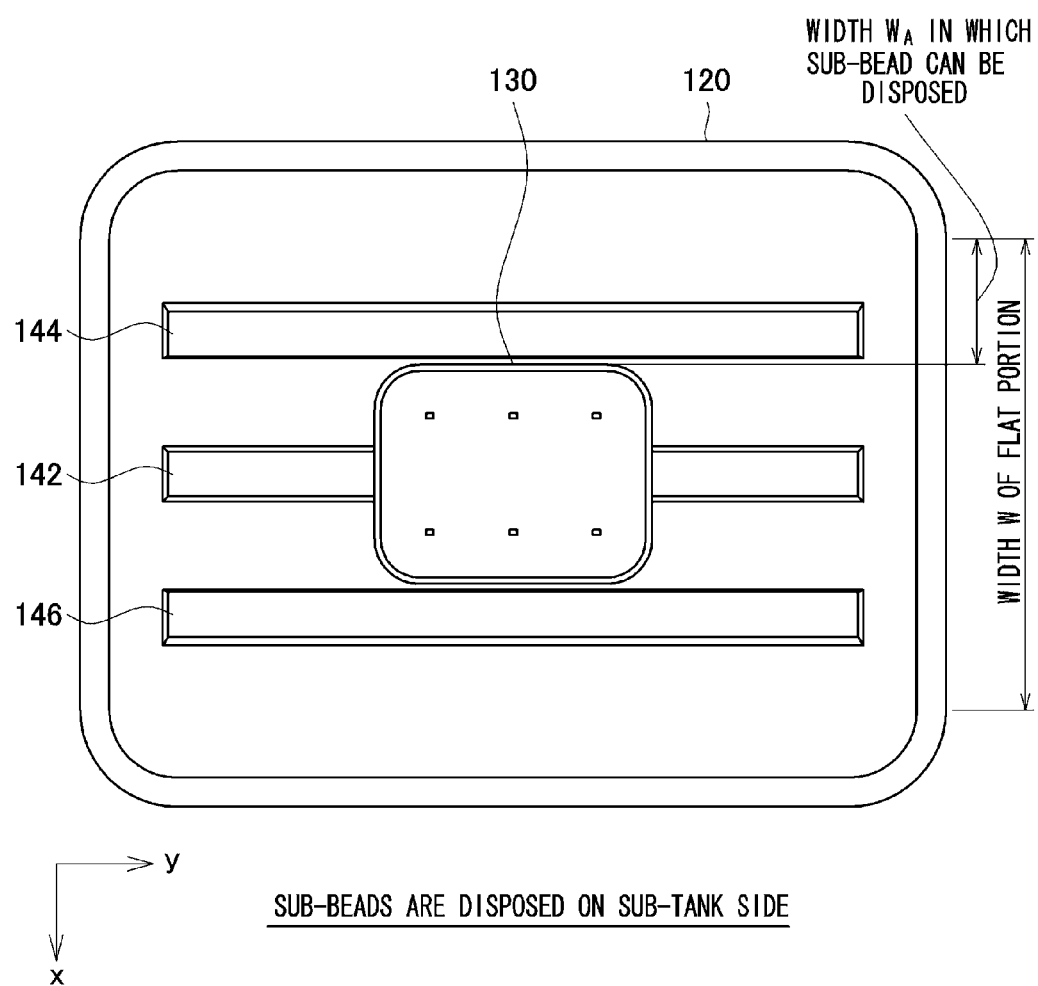

F I G. 12
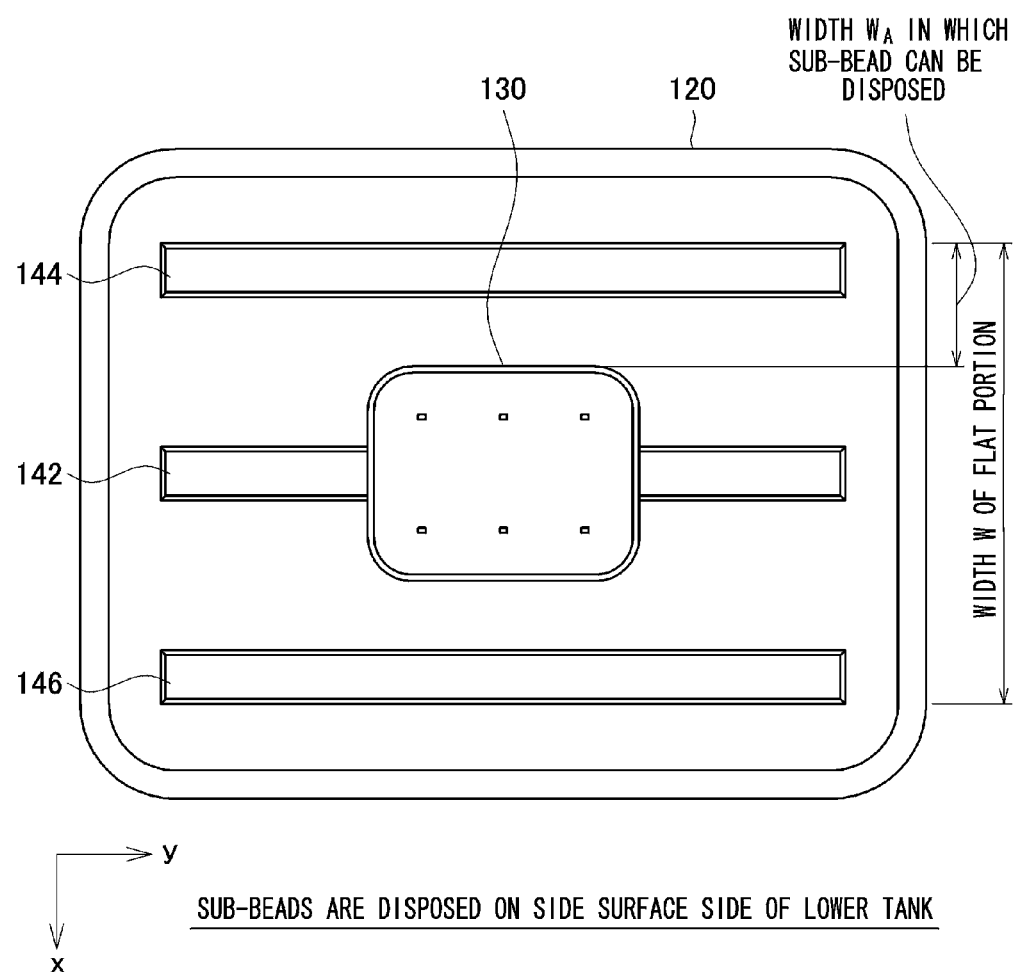
SUB-BEADS ARE DISPOSED ON SIDE SURFACE SIDE OF LOWER TANK

F I G. 13
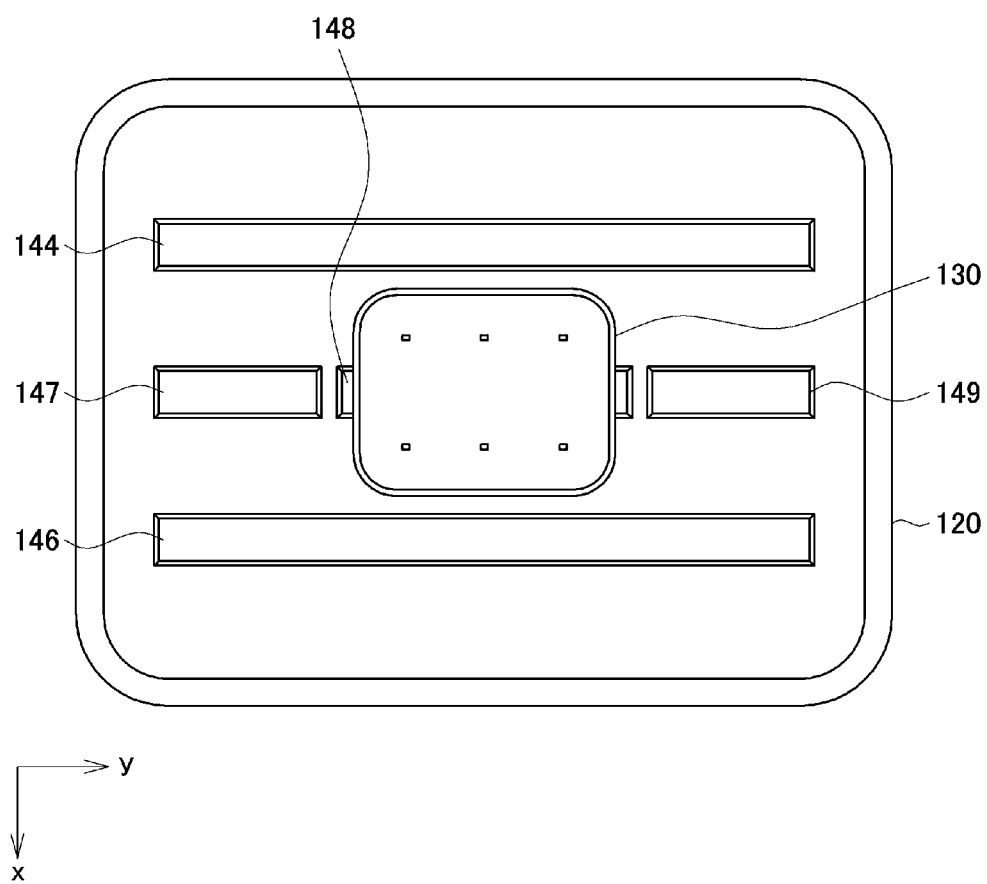

F I G. 14
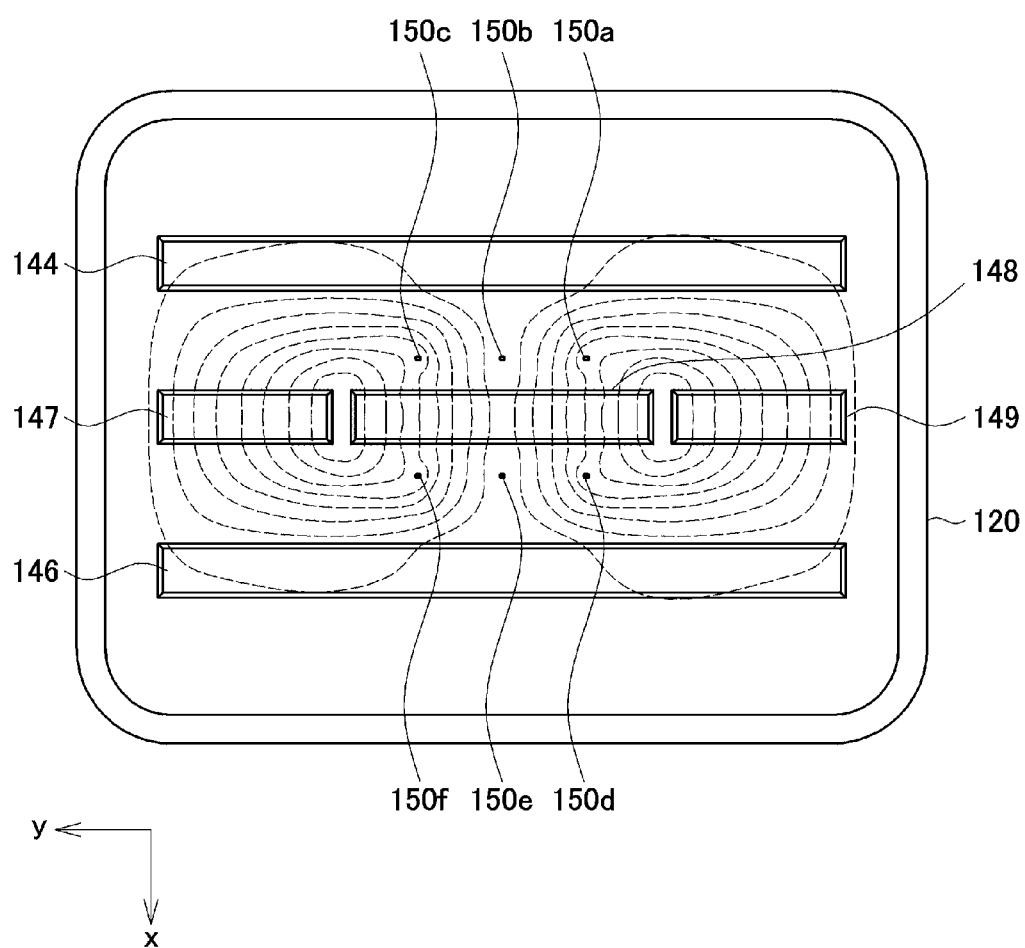

F I G. 19
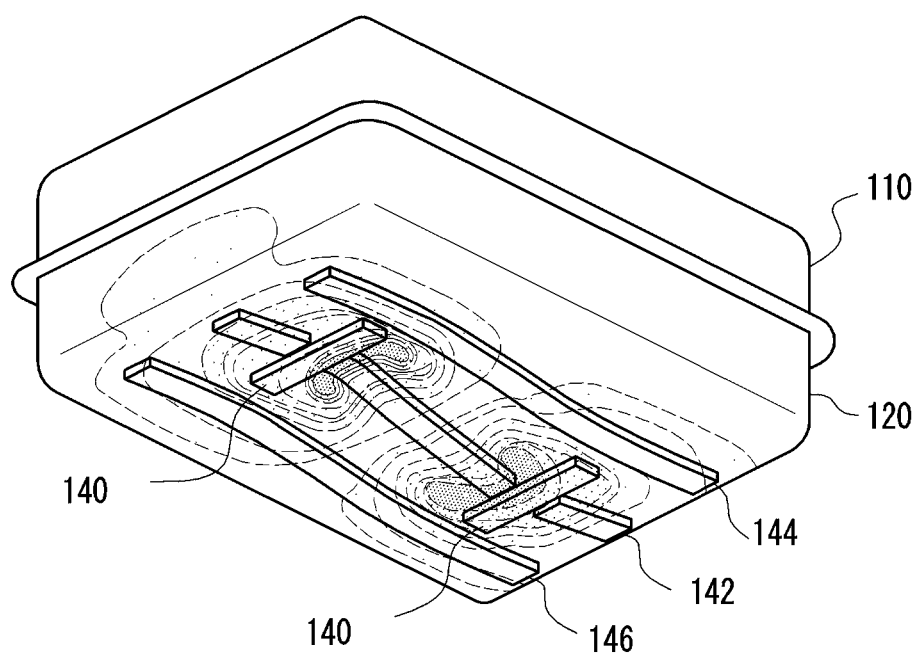
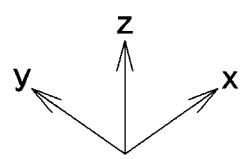

F I G. 21
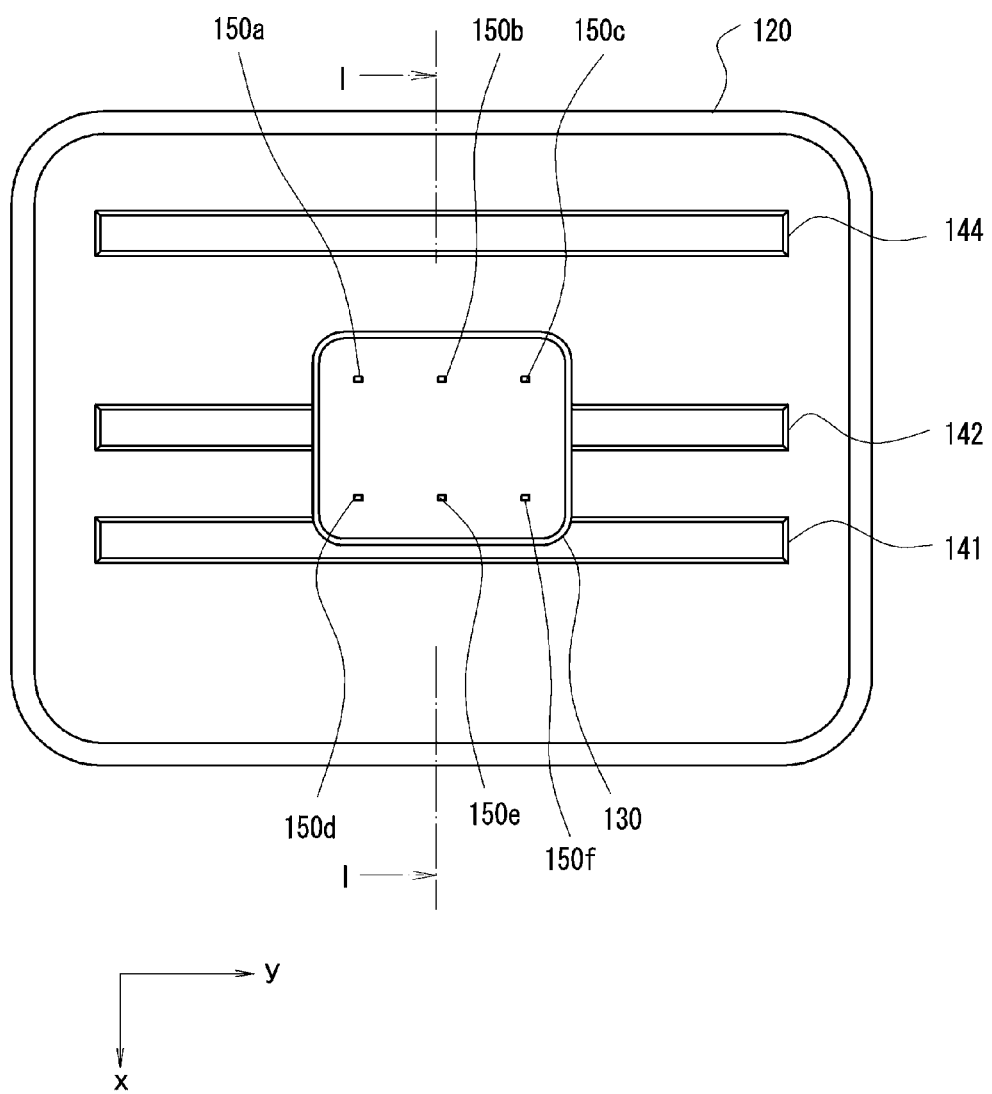

F I G. 22
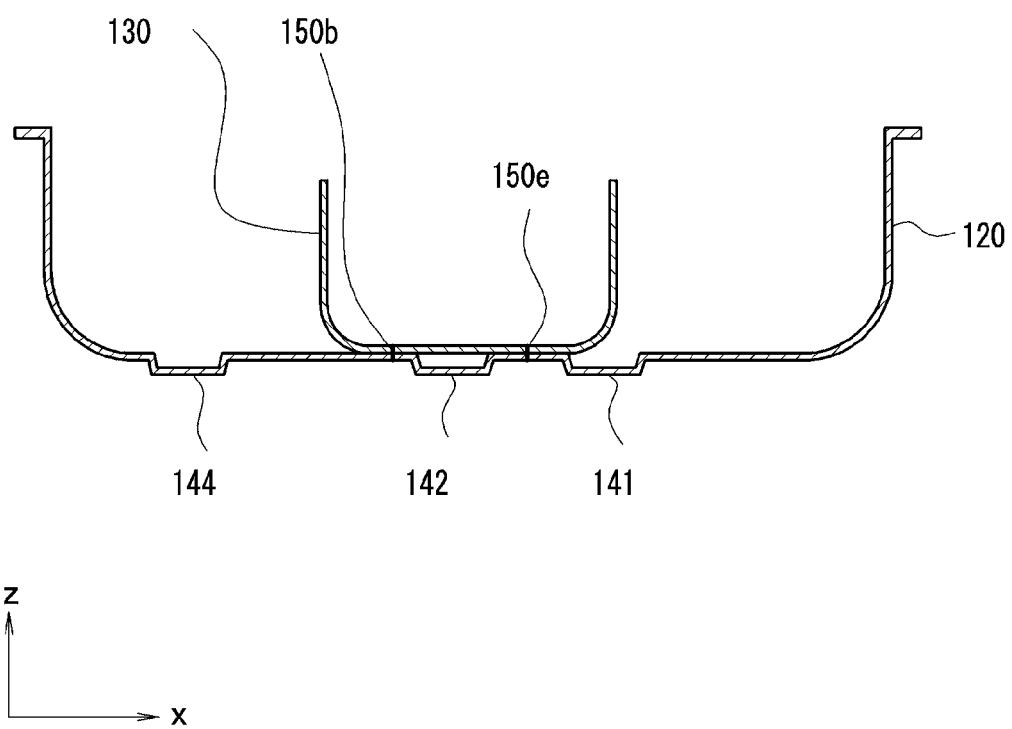

F I G. 24
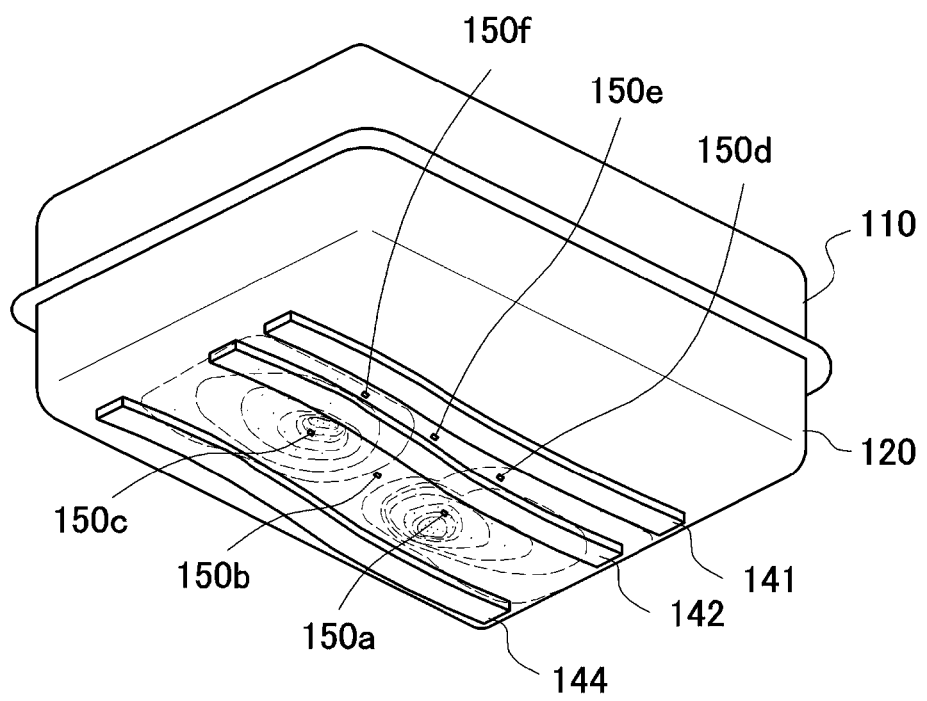

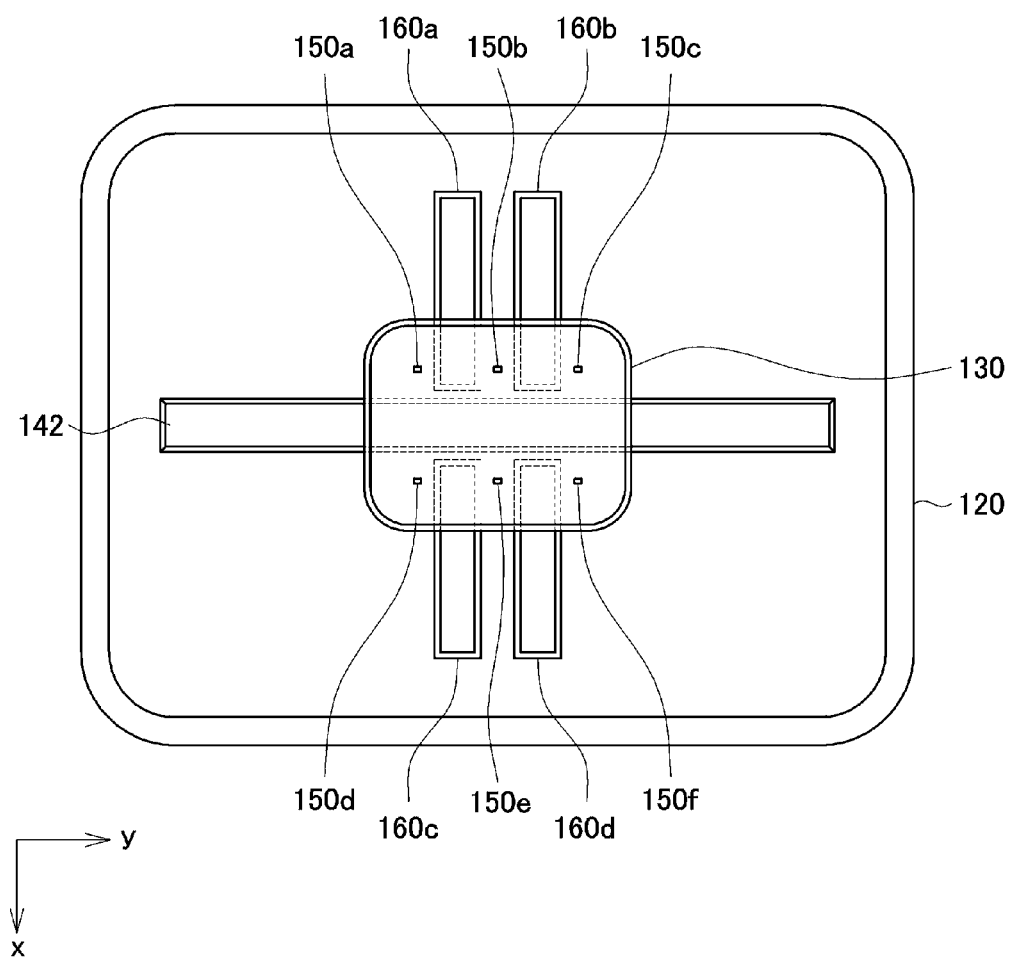
F I G. 26

F I G. 27
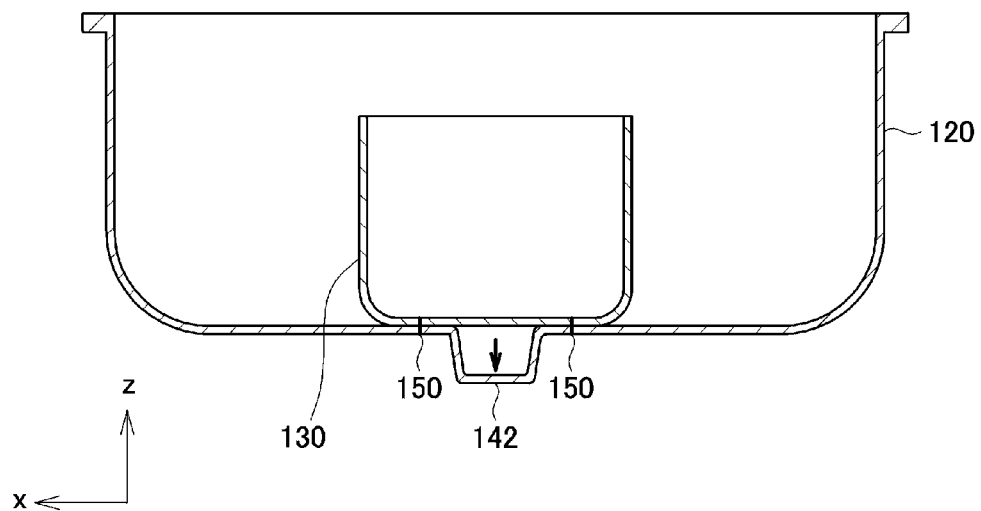
F I G. 28
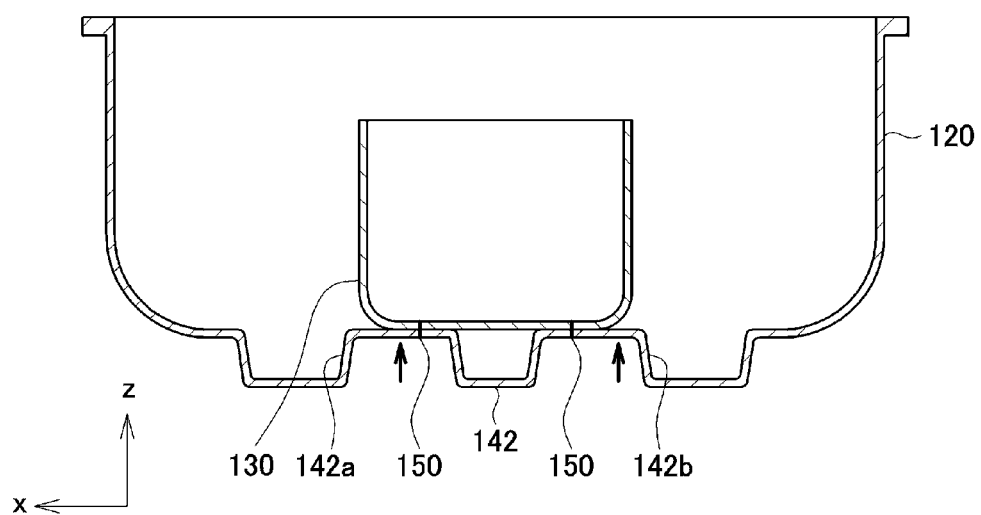

F I G. 30
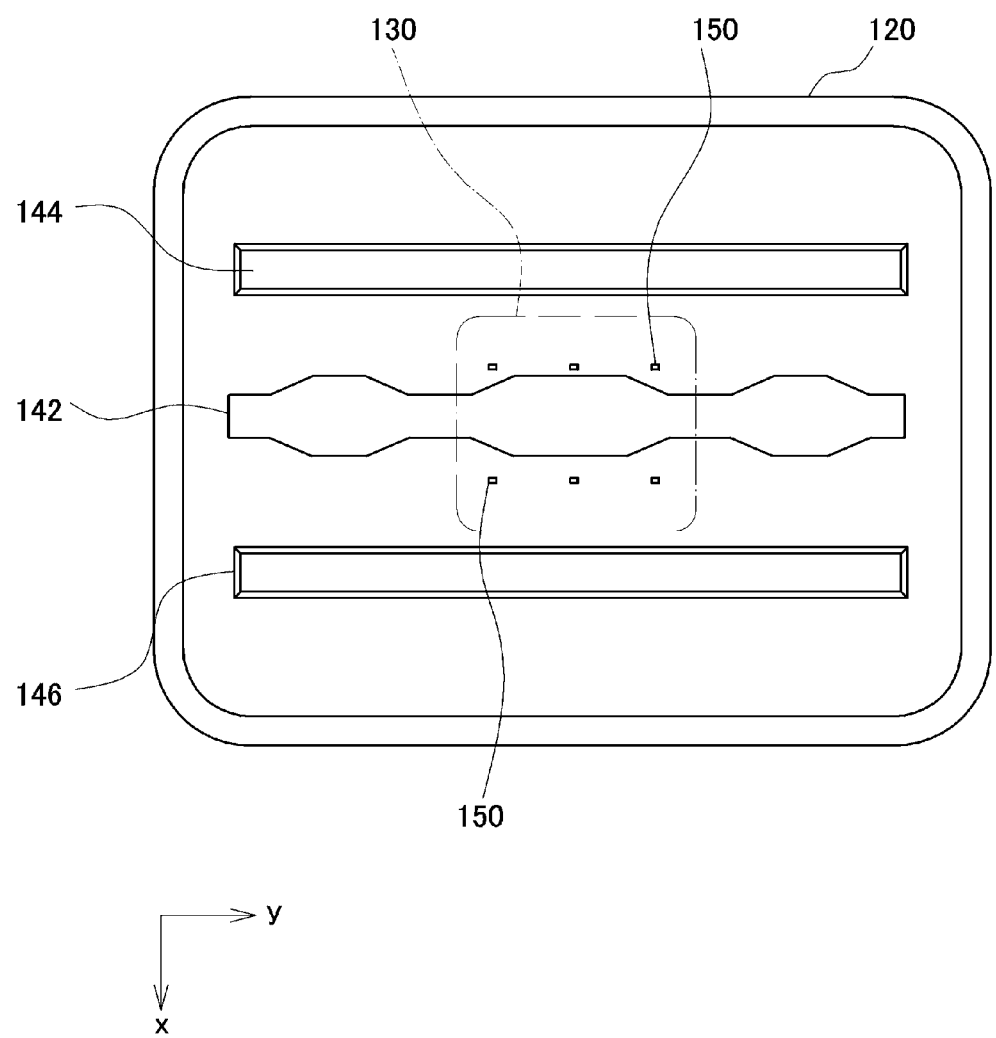

– 1 –

FUEL TANK FOR VEHICLE

TECHNICAL FIELD

The present invention relates to a fuel tank for a vehicle provided in a vehicle.

BACKGROUND ART

In an engine-driven vehicle, a fuel tank housing fuel such as gasoline is provided. The fuel tank is configured by joining an upper tank and a lower tank by welding, and fuel is housed in a closed space formed by the upper tank and the lower tank. On a bottom surface of an inner part of the lower tank of the fuel tank, a sub-tank is generally provided, and it is configured such that even if the vehicle is inclined, a predetermined liquid level is constantly maintained to prevent a suction failure of fuel so that the fuel can be stably supplied to an engine. The sub-tank is fixed to the lower tank by spot welding in a state where a bottom surface of an outer part thereof faces the bottom surface of the inner part of the lower tank.

Regarding a fuel tank for a vehicle, due to a vertical vibration during traveling, a weight of fuel acts on a bottom surface of the fuel tank, and the fuel tank vibrates because it moves up and down, resulting in that a fatigue failure of welded portion at which a lower tank and a sub-tank are joined is caused, which is a problem. For this reason, a reinforcement is made by providing a bead on a bottom surface of the lower tank.

For example, Patent Literature 1 discloses a technique in which a sub-tank is attached to a bottom surface of a tank via a plate-shaped support to reduce a stress concentration on a welded portion, to thereby improve a flexural rigidity. Further, Patent Literature 2 discloses a fuel tank for a vehicle in which spot-welded portions at which a sub-tank and a lower tank are fixed are changed, and concave beads and a convex bead are linearly provided on a bottom surface of the lower tank. Further, Patent Literature 3 discloses a technique in which a stay is provided to make a reinforcement for preventing a separation between a sub-tank and a bottom surface of a tank. Further, Patent Literature 4 discloses a fuel tank for a vehicle provided with beads, on a bottom surface of a tank main body, which extend in different directions at a center portion in a longitudinal direction of the tank main body and at both side portions of an installation part of a sub-tank.

CITATION LIST

Patent Literature

Patent Literature 1: Japanese Laid-open Patent Publication No. 10-44793
Patent Literature 2: Japanese Laid-open Patent Publication No. 2002-321537
Patent Literature 3: Japanese Laid-open Patent Publication No. 2002-67711
Patent Literature 4: Japanese Laid-open Patent Publication No. 2000-158956

SUMMARY OF INVENTION

Technical Problem

However, when the additional member for fixing the sub-tank to the lower tank is provided as in the above-described Patent Literature 1 or 3, a weight of the whole vehicle is increased, which goes against a tendency to make a vehicle lighter. Further, a cost is also increased due to the increase in members, which is also a problem. Meanwhile, when the plurality of beads are discontinuously provided on the lower tank as in the above-described Patent Literature 2 or 4, a strength was proved to be lowered at a discontinuous point of beads. At this time, a sufficient rigidity cannot be obtained even if the arrangement of spot welding is changed as in Patent Literature 2, so that a fatigue failure of welded portions at which the sub-tank and the lower tank are joined cannot be effectively prevented.

Accordingly, the present invention has been made in view of the above-described problems, and an object of the present invention is to provide a new and improved fuel tank capable of increasing a rigidity of a tank and preventing a fatigue failure of welded portions, at which a sub-tank and a lower tank are joined, caused by a vertical vibration during traveling.

Solution to Problem

In order to solve the above-described problems, according to a certain aspect of the present invention, there is provided a fuel tank for a vehicle characterized in that it includes: a tank main body in which an upper tank and a lower tank are mutually joined to form a closed space in which fuel is housed; and a sub-tank fixed to a bottom surface part of the lower tank by spot welding, in which a plurality of rows of the spot welding are set along a longitudinal direction of the lower tank with an interval therebetween in a width direction of the sub-tank, at least one bead positioned between the rows of the spot welding and extending continuously along the longitudinal direction of the lower tank is formed on the bottom surface part of the lower tank, and a lower surface of the sub-tank has no portion that is not brought into contact with the bottom surface part of the lower tank except for the bead.

According to the present invention, on approximately a center line of a length in a first direction (width direction) of the sub-tank on the bottom surface part of the lower tank, there is formed at least one bead extending continuously in a second direction (longitudinal direction) orthogonal to the first direction, so that a natural frequency in a secondary panel vibration mode of the fuel tank for the vehicle can be improved. Accordingly, a rigidity of the fuel tank for the vehicle can be improved, and it becomes possible to prevent a fatigue failure of welded portions, at which the sub-tank and the lower tank are joined, caused by a vertical vibration during traveling.

A length of the bead is set to a length being 80% or more of a length of a flat portion of the bottom surface part of the lower tank in the longitudinal direction. Accordingly, it is possible to sufficiently maintain the rigidity of the fuel tank for the vehicle.

It is also possible that the bead is formed continuously from the bottom surface part to a sidewall part of the lower tank.

It is also possible to design such that the plurality of rows of the spot welding are disposed to be symmetric with respect to the bead formed on approximately the center line in the width direction of the sub-tank.

It is also possible that a width of the bead is set to a length being 50% or more of the interval of the rows of the spot welding which are adjacent with the bead therebetween. Accordingly, it is possible to sufficiently maintain the rigidity of the fuel tank for the vehicle.

Each of embossed portions formed in a vertical direction with respect to the bottom surface part of the lower tank is provided between portions formed by the spot welding and adjacent in the row direction. Accordingly, it is possible to sufficiently maintain the rigidity of the fuel tank for the vehicle.

It is also possible that another bead is formed on a flat portion between an end face in the width direction of the sub-tank to the sidewall part of the lower tank, on the bottom surface part of the lower tank along the longitudinal direction of the lower tank.

It is also possible that the bead is formed as a meandering bead meandering in the width direction or a width-changed bead whose width is changed.

It is also possible that the tank main body and the sub-tank are made of at least any one of materials of a surface treated steel sheet, a stainless steel, and an aluminum alloy, and the lower tank and the sub-tank are formed of the same material.

Advantageous Effects of Invention

As described above, according to the present invention, it is possible to provide the fuel tank capable of increasing the rigidity of the tank and preventing the fatigue failure of the welded portions, at which the sub-tank and the lower tank are joined, caused by the vertical vibration during traveling.

BRIEF DESCRIPTION OF DRAWINGS

FIG. 1 is a perspective view illustrating an external appearance of a fuel tank for a vehicle according to a first embodiment of the present invention.

FIG. 2 is a perspective view illustrating an inner part of a lower tank of the fuel tank for the vehicle according to the first embodiment of the present invention.

FIG. 4 is an explanatory diagram illustrating a secondary panel vibration mode when a length $L_B$ of a bead is set to a length L of a flat portion.

FIG. 5 is an explanatory diagram illustrating the secondary panel vibration mode when the length $L_B$ of the bead is set to the length L of the flat portion.

FIG. 6 is a plan view illustrating a shape of a lower tank when the length $L_B$ of the bead illustrated in FIG. 3 is set to a length being 48% of the length L of the flat portion.

FIG. 7 is an explanatory diagram illustrating a secondary panel vibration mode when the length $L_B$ of the bead is set to the length being 48% of the length L of the flat portion.

FIG. 8 is an explanatory diagram illustrating the secondary panel vibration mode when the length $L_B$ of the bead is set to the length being 48% of the length L of the flat portion.

FIG. 10 is an explanatory diagram illustrating a shape of a lower tank when the bead width $W_B$ of the bead has a length being 19% of the spot welding interval $W_S$.

FIG. 11 is an explanatory diagram illustrating a shape of a lower tank when each of sub-beads is formed on a sub-tank side within a width $W_A$ in which the sub-bead can be disposed.

FIG. 12 is an explanatory diagram illustrating a shape of a lower tank when each of the sub-beads is formed on a side surface side of the lower tank within the width $W_A$ in which the sub-bead can be disposed.

FIG. 13 is an explanatory diagram illustrating a shape of a lower tank when three discontinuous beads are formed on a bottom surface part of the lower tank.

FIG. 14 is an explanatory diagram illustrating a secondary panel vibration mode of a fuel tank having the lower tank in which the discontinuous beads are formed in FIG. 13.

FIG. 19 is an explanatory diagram illustrating the secondary panel vibration mode in the lower tank having the other beads.

FIG. 21 is a plan view of the lower tank in FIG. 20.

FIG. 22 is a sectional view taken along a line I-I in FIG. 21.

FIG. 24 is an explanatory diagram illustrating the secondary panel vibration mode in the lower tank having the portion with which the lower surface of the sub-tank is not brought into contact except for the bead.

FIG. 26 is a plan view illustrating another configuration of the fuel tank according to the second embodiment of the present invention.

FIG. 27 is a sectional view illustrating one example of a shape of a lower tank when a bead formed on the lower tank is set to have a convex shape.

FIG. 28 is a sectional view illustrating one example of a shape of a lower tank when a bead formed on the lower tank is set to have a convex shape.

FIG. 30 is a plan view of a lower tank having a width-changed bead, as a modified example of the present invention.

DESCRIPTION OF EMBODIMENTS

Figure 3:
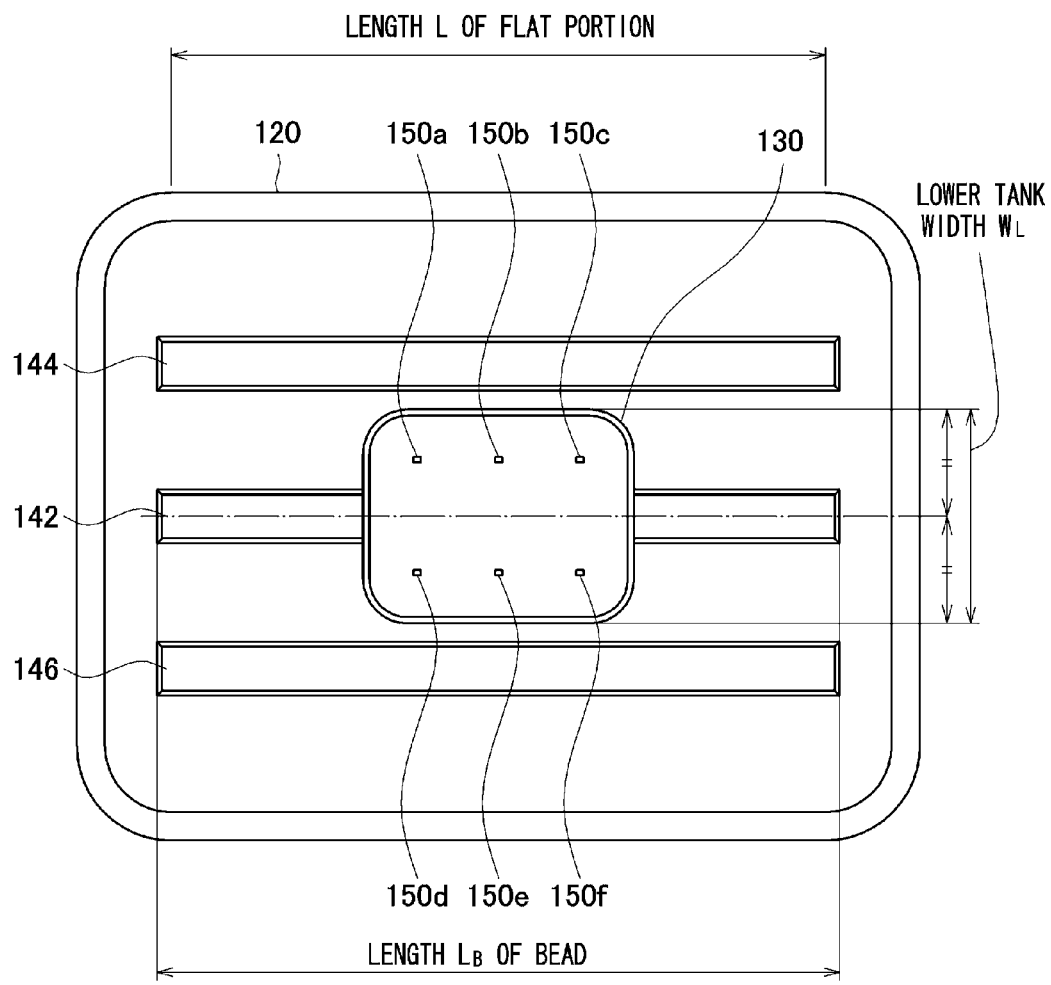
FIG. 3 is a plan view of FIG. 2.

Hereinafter, preferred embodiments of the present invention will be described in detail while referring to the attached drawings. Note that in the present specification and the drawings, components having practically the same functional configuration are denoted by the same reference numerals to omit repeated explanation.

First Embodiment

[1-1. Example of External Appearance of Fuel Tank]

First, explanation will be made on a schematic configuration of a fuel tank for a vehicle 100 according to a first embodiment of the present invention. Note that FIG. 1 is a perspective view illustrating an external appearance of the fuel tank for the vehicle 100 according to the present embodiment. FIG. 2 is a perspective view illustrating an inner part of a lower tank 120 of the fuel tank for the vehicle 100 according to the present embodiment. FIG. 3 is a plan view of FIG. 2. Note that in the description hereinbelow, explanation will be made by setting a longitudinal direction of the fuel tank 100 as a traveling direction of a vehicle.

The fuel tank for the vehicle 100 according to the present embodiment is formed by joining an upper tank 110 and the lower tank 120, as illustrated in FIG. 1. Each of the upper tank 110 and the lower tank 120 according to the present embodiment is formed of a bottom surface part and a sidewall part, and a tank main body is configured by mutually joining the upper tank 110 and the lower tank 120, by making opening portions, namely, flanges formed on edge portions of the sidewall parts of the upper tank 110 and the lower tank 120 face each other. Accordingly, a closed space in which fuel is housed can be formed. A joint portion between the bottom surface part and the sidewall part of each of the upper tank 110 and the lower tank 120 is formed as a curved portion having an R shape.

In the closed space, a sub-tank 130 is fixed to a bottom surface part 124 of the lower tank 120, as illustrated in FIG. 2. The sub-tank 130 is fixed by spot welding. A portion at which the spot welding is conducted is indicated as a spot-welded portion 150. The lower tank 120 and the sub-tank 130 of the present embodiment are fixed by six spot-welded portions 150a to 150f.

On the bottom surface part 124 of the lower tank 120, there is formed a jointless continuous bead 142 in a longitudinal direction (y direction) on approximately a center line of a lower tank width $W_L$ being a length of the sub-tank 130 in a width direction (x direction). As illustrated in FIG. 3, the bead 142 is formed on the lower tank 120 of the present embodiment so that a center of width of the bead 142 is positioned on the center line of the lower tank width $W_L$, but, the bead 142 does not have to be formed exactly on the center line of the lower tank width $W_L$. In this case, it is desirable that the bead 142 is formed on the center line of the lower tank width $W_L$. Further, on both sides of the bead 142, two sub-beads 144 and 146 are formed approximately in parallel to the bead 142.

Each of the upper tank 110, the lower tank 120 and the sub-tank 130 that form the fuel tank 100 is formed of, for example, a surface treated steel sheet obtained by performing surface treatment such as plating and painting, a stainless steel, an aluminum alloy or the like. Note that since the lower tank 120 and the sub-tank 130 are fixed by the spot welding, they are formed of the same material.

Here, the fuel tank for the vehicle 100 according to the present embodiment is characterized in that the bead 142 extending continuously along the longitudinal direction on approximately the center line of the lower tank width $W_L$ of the sub-tank 130 is formed on the bottom surface part 124 of the lower tank 120. As described above, a bead has been conventionally provided on the lower tank 120 to improve the rigidity of the fuel tank 100, but, the fatigue failure of the spot-welded portions, at which the sub-tank and the lower tank are joined, caused by the vertical vibration during traveling, has not been effectively prevented.

As a result of earnest studies, the inventors of the present application found out that in the fuel tank 100 in which the sub-tank 130 is attached to the bottom surface part 124 of the lower tank 120, a secondary panel vibration mode of the bottom surface part 124 of the lower tank 120 is a main cause of separating the spot-welded portions 150 fixing the lower tank 120 and the sub-tank 130. Specifically, in the fuel tank 100 according to the present embodiment, it is important to effectively improve the rigidity (natural frequency) with respect to the secondary panel vibration mode of the bottom surface part 124 of the lower tank 120, and there is a need to form a bead corresponding to such a mode on the lower tank 120. Further, it was proved that, by forming the jointless continuous bead 142 in the longitudinal direction on approximately the center line of the lower tank width $W_L$ of the sub-tank 130, the rigidity (natural frequency) with respect to the secondary panel vibration mode of the bottom surface part 124 of the lower tank 120 can be effectively improved.

Hereinafter, a shape of the bead 142 formed on the lower tank 120 of the fuel tank 100 according to the present embodiment, and a shape of the sub-beads 144 and 146 provided to further increase the rigidity of the fuel tank 100, will be described in detail.

[1-2. Shape of Bead]

(A. Length of Bead)

First, a length $L_B$ in the longitudinal direction of the bead 142 formed on the lower tank 120 will be described based on FIG. 3 to FIG. 8. It is desirable to set the length $L_B$ of the bead 142 to a length being about 80% or more of a length L of a flat portion being a portion in which an R shape of the bottom surface part 124 of the lower tank 120 is not formed. By setting the length $L_B$ of the bead 142 to such a length, it is possible that the reduction in the natural frequency in the secondary panel vibration mode is suppressed to 10% at the maximum, resulting in that the rigidity of the fuel tank 100 can be sufficiently maintained. Accordingly, the fatigue failure of the spot-welded portions 150, at which the sub-tank 130 and the lower tank 120 are joined, caused by the vertical vibration during traveling, can be prevented over a period of time during which the fuel tank 100 is in service.

On the contrary, it was found out that, when the natural frequency in the secondary panel vibration mode is reduced by more than 10%, the rigidity of the fuel tank 100 becomes insufficient, resulting in that the fatigue failure of the spot-welded portions 150 frequently occurs during the period of time in which the fuel tank 100 is in service.

An effect provided by setting the length of $L_B$ of the bead 142 to the length being about 80% or more of the length L of the flat portion, was verified by a simulation using a finite element method. As conditions of the simulation, a length, a width, and a height as a size of the lower tank 120 were set to 600 mm, 450 mm, and 120 mm, respectively, and a length, a width, and a height as a size of the sub-tank 130 were set to 200 mm, 160 mm, and 90 mm, respectively. Further, it was set such that the bead 142 and the sub-beads 144 and 146 are formed on the bottom surface part 124 of the lower tank 120 as illustrated in FIG. 3, and each of these beads has a width of 40 mm and a depth of 7 mm. The lower tank 120 and the sub-tank 130 are set to be fixed by spot-welded portions 150a to 150c provided in the longitudinal direction between the bead 142 and the sub-bead 144, and spot-welded portions 150d to 150f provided in the longitudinal direction between the bead 142 and the sub-bead 146.

Further, a ratio of the length $L_B$ of the bead 142 to the length L of the flat portion of the lower tank 120 is changed, and a ratio of a natural frequency after changing the length $L_B$ of the bead 142 to a natural frequency when the length $L_B$ of the bead 142 is the length L of the flat portion (also referred to as a "first reference natural frequency") was calculated.

The following Table 1 and FIG. 4 to FIG. 8 present results of the above-described simulation. Each of FIG. 4 and FIG. 5 is an explanatory diagram illustrating a secondary panel vibration mode when the length $L_B$ of the bead 142 is set to the length L of the flat portion. FIG. 6 is a plan view illustrating a shape of the lower tank 120 when the length $L_B$ of the bead 142 is set to a length being 48% of the length L of the flat portion. Each of FIG. 7 and FIG. 8 is an explanatory diagram illustrating a secondary panel vibration mode when the length $L_B$ of the bead 142 is set to the length being 48% of the length L of the flat portion. Note that in FIGS. 4, 5, 7 and 8, a portion with a deeper color indicates a portion with a larger amplitude in the fuel tank 100 in the up and down directions (z direction).

TABLE 1

| LENGTH OF BEAD [%] | NATURAL FREQUENCY [%] |
| --- | --- |
| 100 | 100 |
| 80 | 90 |
| 64 | 76 |
| 48 | 70 |

From the results in Table 1, it can be understood that as the length $L_B$ of the bead 142 is set to be shorter than the length L of the flat portion, the ratio of the natural frequency to the first reference natural frequency is lowered. Therefore, when the length $L_B$ of the bead 142 becomes too small, the rigidity of the fuel tank 100 cannot be sufficiently secured.

Further, when the secondary panel vibration mode when the length $L_B$ of the bead 142 is set to the length L of the flat portion is seen, among the spot-welded portions arranged in two rows in the longitudinal direction, each row having three spot-welded portions, an amplitude in each of the spot-welded portions 150a, 150c, 150d and 150f close to a sidewall part 122 of the lower tank 120, is larger than that of another portion, as illustrated in FIG. 4 and FIG. 5. Specifically, as illustrated in FIG. 5, it can be understood that the lower tank 120 vibrates in a vibration mode in which the spot-welded portions 150a, 150c, 150d and 150f are set to antinodes, and the spot-welded portions 150b and 150e are set to nodes.

Meanwhile, when the secondary panel vibration mode of the lower tank 120 when the length $L_B$ of the bead 142 is set to the length being 48% of the length L of the flat portion illustrated in FIG. 6 is seen, an amplitude in the up and down directions (z direction) in the vicinity of both ends of the bead 142 is increased, as illustrated in FIG. 7 and FIG. 8. At this time, it can be understood that, when compared to a case where the length $L_B$ of the bead 142 is set to the length L of the flat portion, a magnitude of amplitude in the up and down directions is also increased, resulting in that the lower tank 120 is largely vibrated, and the sufficient rigidity is not maintained.

From the results of simulation as above, it is judged that a sufficient rigidity as the lower tank 120 is maintained in a state up to when the reduction in the natural frequency from the first reference natural frequency is suppressed to about 10%, and accordingly, the length $L_B$ of the bead 142 was defined as 80% or more of the length L of the flat portion. Note that it is also possible that the length $L_B$ of the bead 142 exceeds the length L of the flat portion of the lower tank 120, and the bead is formed continuously to reach the sidewall part 122.

(B. Bead Width)

Figure 9:
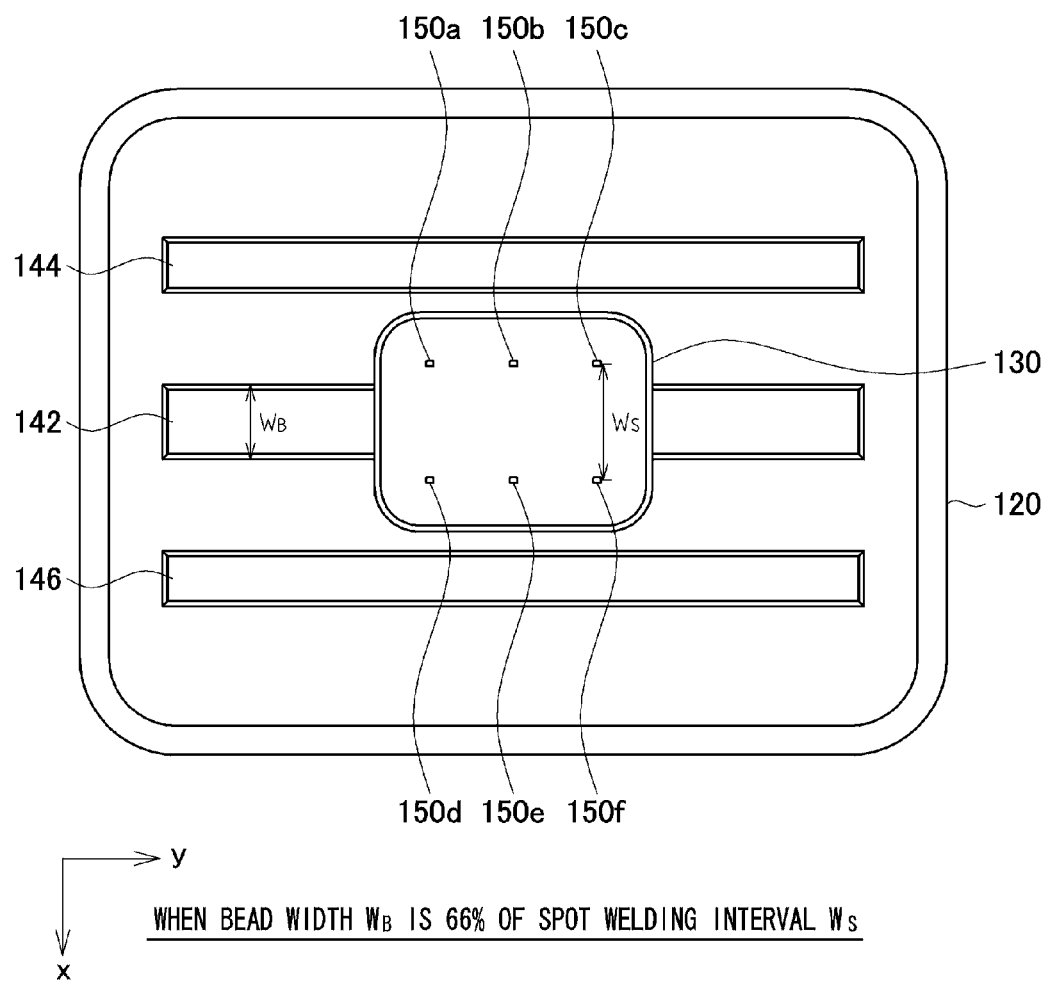
FIG. 9 is an explanatory diagram illustrating a shape of a lower tank when a bead width $W_B$ of the bead has a length being 66% of a spot welding interval $W_S$.

Next, explanation will be made on a bead width $W_B$ in an x direction of the bead 142, based on FIG. 9 and FIG. 10. The bead width $W_B$ of the bead 142 formed on the lower tank 120 according to the present embodiment is desirably set to have a length being about 50% or more of an interval between the two rows of spot-welded portions 150a to 150c and 150d to 150f adjacent in the x direction (also referred to as a "spot welding interval") $W_S$. By setting the bead width $W_B$ to have the length being about 50% or more of the spot welding interval $W_S$, it is possible to suppress the reduction in the natural frequency in the secondary panel vibration mode to about 10%, resulting in that the rigidity of the fuel tank 100 can be sufficiently maintained.

An effect provided by setting the bead width $W_B$ to have the length being about 50% or more of the spot welding interval $W_S$, was verified by a simulation using a finite element method. Here, a length, a width, and a height as a size of the lower tank 120 were set to 600 mm, 450 mm, and 120 mm, respectively, and a length, a width, and a height as a size of the sub-tank 130 were set to 200 mm, 160 mm, and 90 mm, respectively. Further, it was set such that the bead 142 and the sub-beads 144 and 146 are formed on the bottom surface part 124 of the lower tank 120 as illustrated in FIG. 3, and each of these beads has a depth of 7 mm. The lower tank 120 and the sub-tank 130 are set to be fixed by the spot-welded portions 150a to 150c provided in the longitudinal direction between the bead 142 and the sub-bead 144, and the spot-welded portions 150d to 150f provided in the longitudinal direction between the bead 142 and the sub-bead 146. The spot welding interval $W_S$ was set to 85 mm, and a bead width of each of the sub-beads 144 and 146 was set to 40 mm.

Further, a ratio of the bead width $W_B$ of the bead 142 to the spot welding interval $W_S$ is changed, and a ratio of a natural frequency after changing the bead width $W_B$ of the bead 142 to a natural frequency when the bead width $W_B$ of the bead 142 has a length being 66% of the spot welding interval $W_S$ (also referred to as a "second reference natural frequency") was calculated. Note that the length being 66% of the spot welding interval $W_S$ is a maximum value of the bead width $W_B$ of the bead 142 capable of being obtained in the manufacture in which a space required at the time of performing the spot welding operation is taken into consideration (refer to FIG. 9).

The following Table 2 presents results of the above-described simulation. Further, FIG. 9 illustrates a shape of the lower tank 120 when the bead width $W_B$ of the bead 142 has a length being 66% of the spot welding interval $W_S$, and FIG. 10 illustrates a shape of the lower tank 120 when the bead width $W_B$ of the bead 142 has a length being 19% of the spot welding interval $W_S$.

TABLE 2

| BEAD WIDTH [%] | NATURAL FREQUENCY [%] |
| --- | --- |
| 66 | 100 |
| 47 | 92 |
| 28 | 84 |
| 19 | 80 |

From the results in Table 2, it can be understood that as the bead width $W_B$ of the bead 142 becomes smaller, the ratio of the natural frequency to the second reference natural frequency is lowered. Specifically, as the bead width $W_B$ of the bead 142 becomes smaller, the vibration in the up and down directions of the lower tank 120 is increased. From the results of the simulation, it is judged that a sufficient rigidity as the lower tank 120 is maintained in a state up to when the reduction in the natural frequency from the second reference natural frequency is suppressed to about 10%, and accordingly, the bead width $W_B$ of the bead 142 was defined as 50% or more of the spot welding interval $W_S$.

(C. Position of Sub-Bead)

On the lower tank 120 according to the present embodiment, the sub-beads 144 and 146 are formed on both sides of the jointless continuous bead 142 formed in the longitudinal direction on approximately the center line of the lower tank width $W_L$ of the sub-tank 130. The sub-beads 144 and 146 are formed in an auxiliary manner to further increase the rigidity of the lower tank 120. Each of the sub-beads 144 and 146 is only required to be formed on a flat portion from an end face of the sub-tank 130 to an end of an R shape of a curved portion of the lower tank 120 (also referred to as a "width $W_A$ in which the sub-bead can be disposed") in the width direction of the lower tank 120. For example, each of the sub-beads 144 and 146 can also be formed on the sub-tank 130 side as illustrated in FIG. 11, or can also be formed on a side surface side of the lower tank 120 as illustrated in FIG. 12, within the width $W_A$ in which the sub-bead can be disposed.

A simulation regarding how much of the rigidity of the fuel tank 100 is changed depending on the positions at which the sub-beads 144 and 146 are formed, was conducted. In the simulation, tanks having the same shapes as those of the lower tank 120 and the sub-tank 130 set in the studies regarding the length of bead described above, are assumed, and a change in the natural frequency when the installation positions of the sub-beads 144 and 146 are changed on the flat portion from the end face of the sub-tank 130 to the end of the R shape of the lower tank 120, was verified. As a result of this, even if the installation positions of the sub-beads 144 and 146 are changed within the above-described range, a value of the natural frequency is changed by 10% or less with respect to the first reference natural frequency, and no large change in the natural frequency caused by the change in the installation positions of the sub-beads 144 and 146 was observed.

Therefore, each of the sub-beads 144 and 146 is only required to be formed in the width $W_A$ in which the sub-bead can be disposed, on the flat portion from the end face of the sub-tank 130 to the end of the R shape of the curved portion of the lower tank 120. Accordingly, the reduction in the natural frequency in the secondary panel vibration mode can be suppressed to about 10%, and it is possible to sufficiently maintain the rigidity of the fuel tank 100.

[1-3. Verification of Effect Obtained by Forming Continuous Bead]

The lower tank 120 according to the present embodiment suppresses a large reduction in the natural frequency in the secondary panel vibration mode by forming the jointless continuous bead 142 formed in the longitudinal direction on approximately the center line of the lower tank width $W_L$ of the sub-tank 130. Here, there was conducted a simulation of verifying an effect provided by continuously forming the bead 142 in the longitudinal direction on the bottom surface part 124 of the lower tank 120, by comparing the tank with a fuel tank with a conventional configuration.

In the present simulation, regarding a case where the bead 142 is formed continuously in the longitudinal direction on the bottom surface part 124 of the lower tank 120 illustrated in FIG. 3 (configuration according to the present embodiment) and a case where three discontinuous beads 147 to 149 are formed in the longitudinal direction on approximately the center line of the lower tank width $W_L$ of the sub-tank 130 on the bottom surface part 124 of the lower tank 120 illustrated in FIG. 13 (conventional configuration), natural frequencies in the secondary panel vibration mode were compared. Note that the present simulation was conducted by assuming tanks having the same shapes as those of the lower tank 120 and the sub-tank 130 set in the studies regarding the length of bead described above.

On the bottom surface part 124 of the lower tank 120 illustrated in FIG. 13, there are provided the bead 148 formed on the bottom surface part of the sub-tank 130 on approximately the center line of the lower tank width $W_L$ of the sub-tank 130, and the beads 147 and 149 formed, by being adjacent to the bead 148, in the longitudinal direction. Discontinuous portions of bead exist between the bead 147 and the bead 148, and between the bead 148 and the bead 149. As a result of the simulation, a natural frequency in the secondary panel vibration mode of such a lower tank 120 was proved to be largely lowered by about 30%, compared to the natural frequency (first reference natural frequency) of the lower tank 120 illustrated in FIG. 3.

Figure 15:
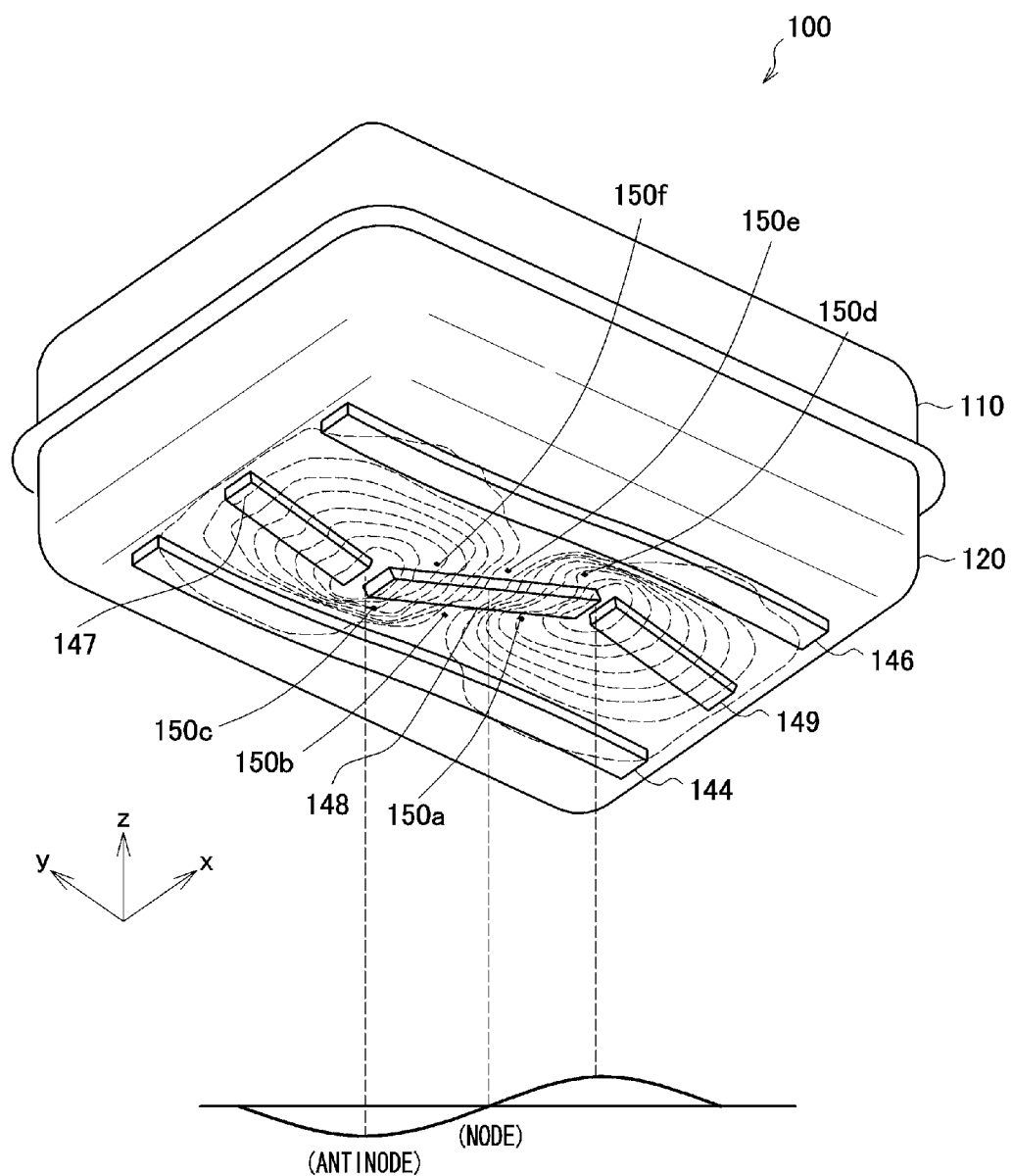
FIG. 15 is an explanatory diagram illustrating the secondary panel vibration mode of the fuel tank having the lower tank in which the discontinuous beads are formed in FIG. 13.

When the secondary panel vibration mode of the lower tank illustrated in FIG. 13 is seen, it can be understood that the rigidity is locally lowered in the discontinuous portions of bead existed between the bead 147 and the bead 148, and between the bead 148 and the bead 149, and at the portions, the largest displacement of vibration occurs, as illustrated in FIG. 14 and FIG. 15. As described above, it can be understood that, when compared to a case where the continuous bead 142 is formed in the longitudinal direction, the magnitude of amplitude in the up and down directions is also increased, resulting in that the lower tank 120 is largely vibrated and the sufficient rigidity is not maintained.

From the results of the present simulation, it can be recognized that, by forming the bead 142 continued in the longitudinal direction on approximately the center line of the lower tank width $W_L$ of the sub-tank 130 on the bottom surface part 124 of the lower tank 120, it is possible to effectively improve the natural frequency in the secondary panel vibration mode, when compared to a case where the discontinuous beads 147 to 149 are formed.

[1-4. Relation with Beads in Different Direction and the Like]

(A. Area in Periphery of Extension in Longitudinal Direction of Bead)

Further, in the lower tank 120 according to the present embodiment, it is extremely effective not to form beads in a different direction in a periphery of extension in the longitudinal direction of the bead formed on the bottom surface part of the sub-tank 130, for securing the rigidity. Here, the periphery of extension in the longitudinal direction of the bead means a periphery of area with an extent including the bead itself and an extension in the longitudinal direction of the bead, and positioned on the outside of the sub-tank 130.

Specifically, when there is no bead with a sufficient length in the longitudinal direction of the lower tank 120, if beads in the different direction are disposed on the extension in the longitudinal direction of the bead, an effect of preventing the reduction in the natural frequency cannot be practically obtained.

On the other hand, when the bead in the longitudinal direction of the lower tank 120 has a sufficient length, namely, when there is a bead having a length being 80% or more of the length in the longitudinal direction of the flat portion on the bottom surface of the lower tank 120, even if beads in the different direction or in the same direction are disposed on a very small portion on the extension of the bead, there is no influence due to the disposition, namely, no change in the natural frequency is caused.

Figure 16:
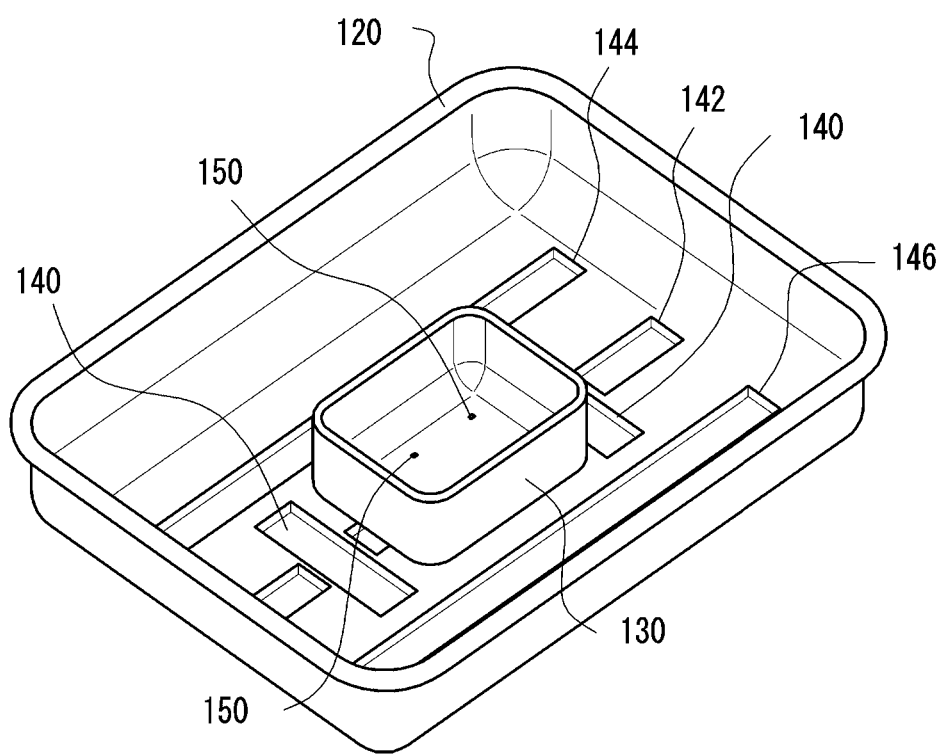
FIG. 16 is a perspective view illustrating an inner part of a lower tank having other beads in a periphery of extension of bead, as a comparative example with respect to the present invention.
Figure 17:
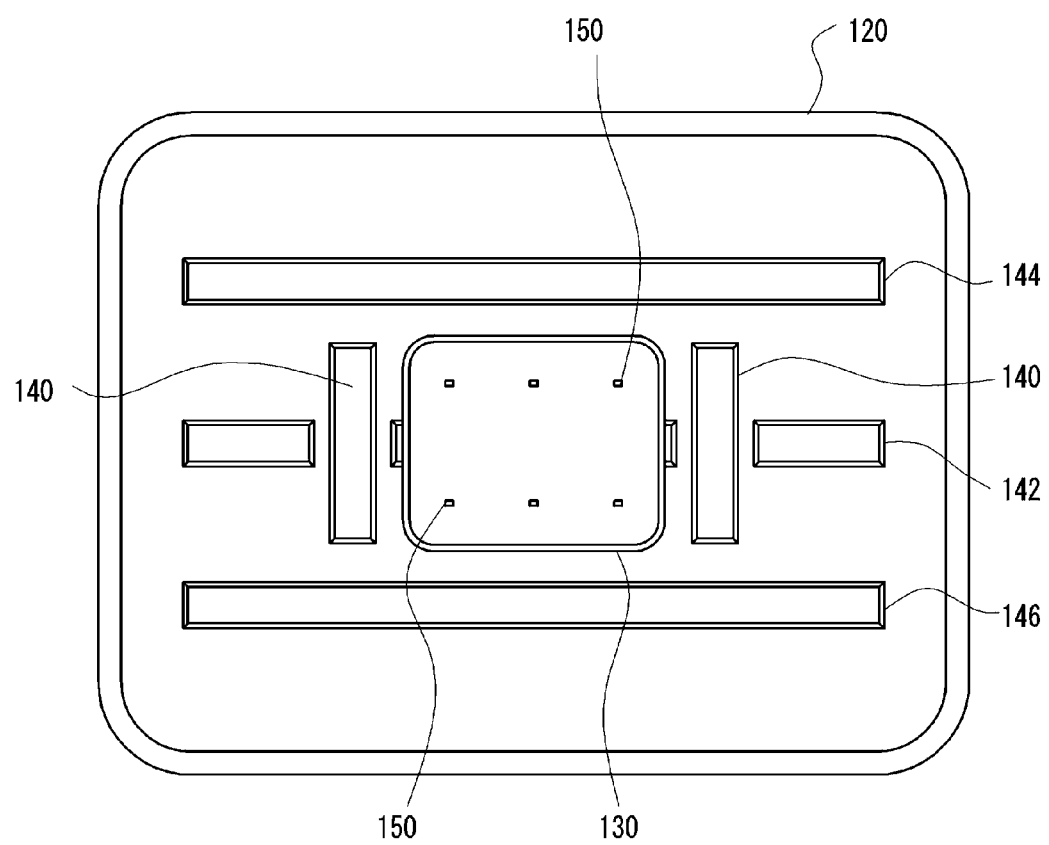
FIG. 17 is a plan view of the lower tank in FIG. 16.

For example, it is set that in the lower tank 120, the sub-beads 144 and 146 are formed on both sides of the bead 142 formed in the longitudinal direction on the bottom surface part of the sub-tank 130, as illustrated in FIG. 16 and FIG. 17. In this case, a case where two beads 140 are formed on both sides of the sub-tank 130 along a direction orthogonal to the longitudinal direction of the bead 142 as beads in the different direction on discontinuous portions of the bead 142, is set as a comparative example. Further, an influence given by a model with such a configuration, namely, a case where the beads 140 in the different direction being a direction orthogonal to the longitudinal direction of the bead 142, are formed in the periphery of extension in the longitudinal direction of the bead 142, was verified by a simulation.

In this model, a natural frequency in the secondary panel vibration mode of the model and the first reference natural frequency were compared, and as a result of calculation, it was proved that the natural frequency in the secondary panel vibration mode of the present model is reduced by about 15%, compared to the first reference natural frequency.

Figure 18:
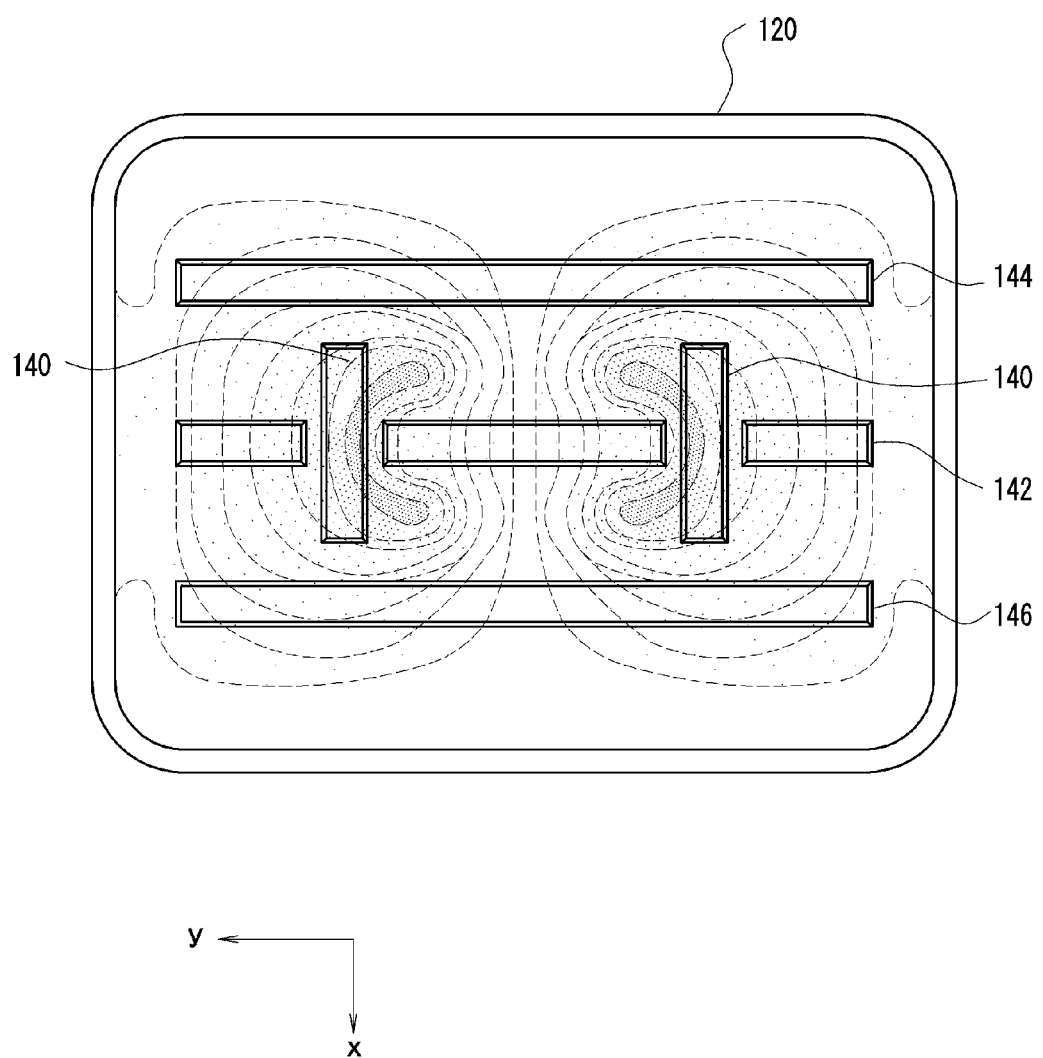
FIG. 18 is an explanatory diagram illustrating a secondary panel vibration mode in the lower tank having the other beads.

FIG. 18 and FIG. 19 present results of the simulation of the secondary panel vibration mode in this model. As illustrated in these drawings, the rigidity is locally lowered in the discontinuous portions in which the beads 140 in the direction orthogonal to the longitudinal direction exist as the beads in the different direction, and at the portions, the largest displacement of vibration occurs, resulting in that the rigidity is lowered when the beads 140 in the different direction are formed in the periphery of extension in the longitudinal direction of the bead 142. Therefore, it is suitable that the beads in the different direction are not formed in the periphery of extension in the longitudinal direction of the bead 142.

(B. Lower Surface Area of Sub-Tank)

Further, in the lower tank 120 according to the present embodiment, it is extremely effective that the lower surface of the sub-tank 130 has no portion that is not brought into contact with the bottom surface part of the lower tank 120 except for the bead, for securing a failure strength of the spot-welded portions.

Figure 20:
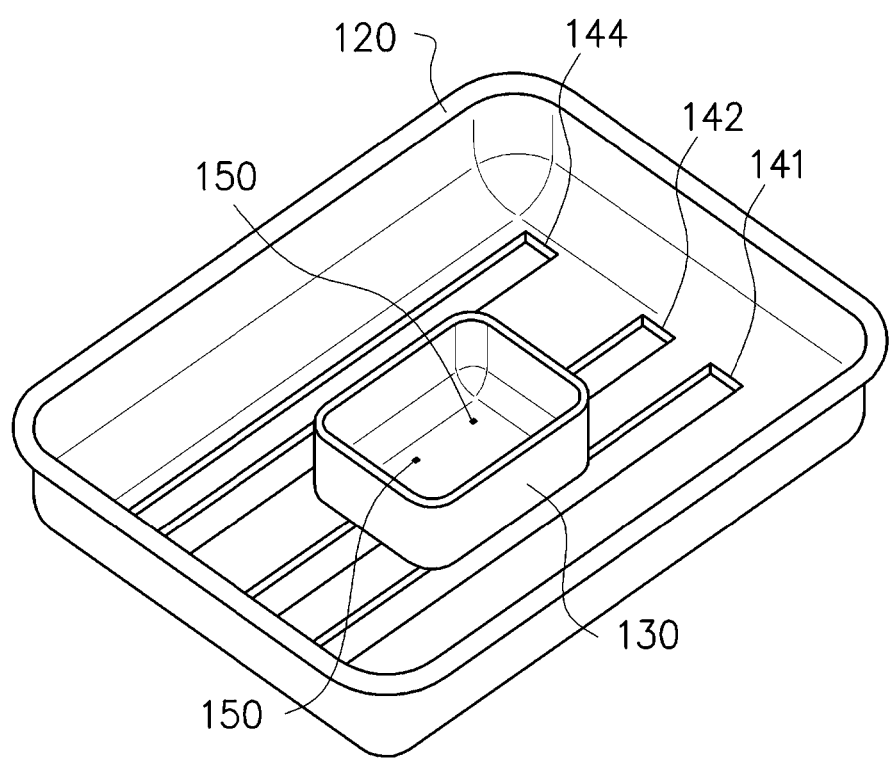
FIG. 20 is a perspective view illustrating an inner part of a lower tank having a portion with which a lower surface of a sub-tank is not brought into contact except for a bead, as a comparative example with respect to the present invention.

For example, it is set that in the lower tank 120, sub-beads 141 and 144 are formed on both sides of the bead 142 formed in the longitudinal direction on the bottom surface part of the sub-tank 130, as illustrated in FIG. 20 to FIG. 22. In this case, a case where there exists a portion at which the lower surface of the sub-tank 130 is not brought into contact with the bottom surface part of the lower tank 120 due to, other than the bead 142, the sub-bead 141 being one of the sub-beads, as illustrated also in the example of the aforementioned Patent Literature 4 (FIG. 10), is set as a comparative example. Further, an influence given by a model with such a configuration, namely, a case where the lower surface of the sub-tank 130 has a portion that is not brought into contact with the bottom surface part of the lower tank 120 other than the bead 142, was verified by a simulation.

In this model, a natural frequency in the secondary panel vibration mode of the model and the first reference natural frequency were compared, and as a result of calculation, it was proved that the natural frequency in the secondary panel vibration mode of the present model is lowered by about 15%, compared to the first reference natural frequency.

Figure 23:
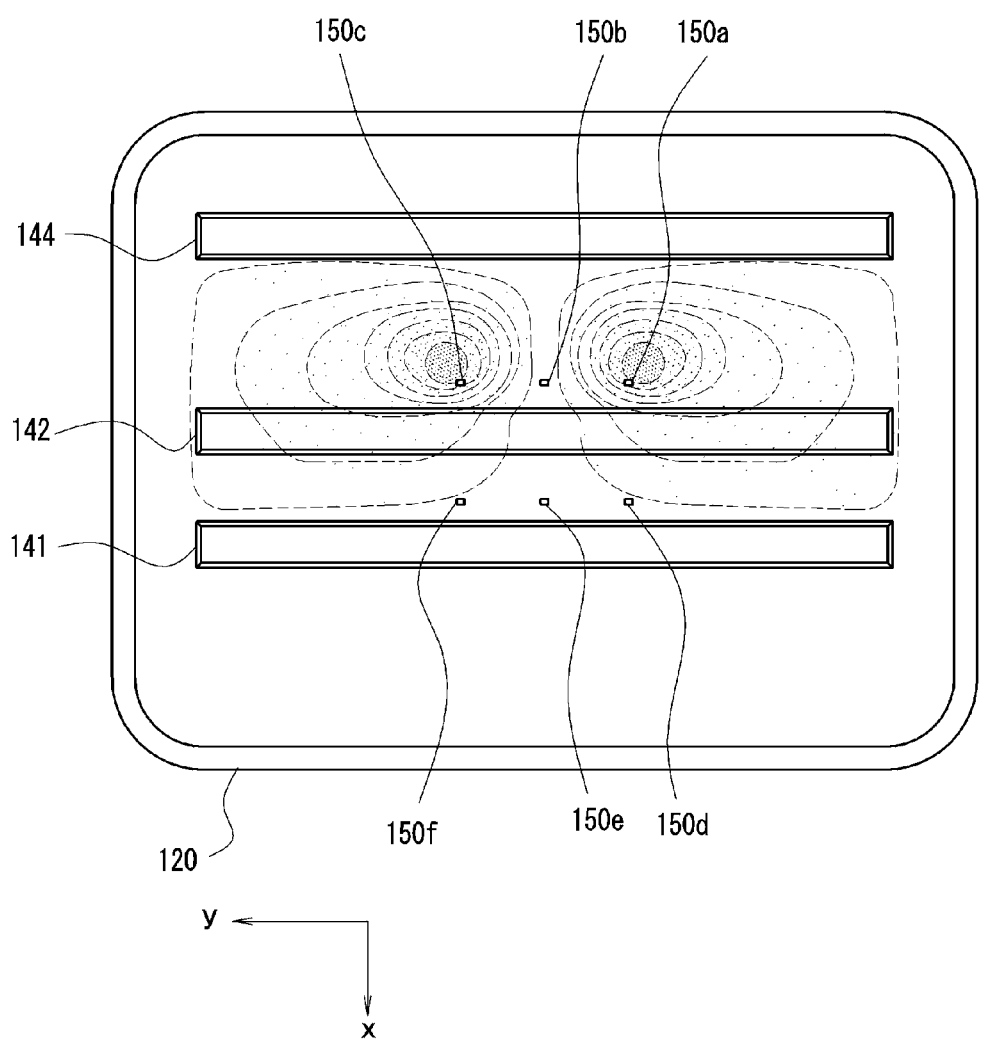
FIG. 23 is an explanatory diagram illustrating a secondary panel vibration mode in the lower tank having the portion with which the lower surface of the sub-tank is not brought into contact except for the bead.

FIG. 23 and FIG. 24 present results of the simulation of the secondary panel vibration mode in this model. As illustrated in these drawings, since there exists a portion of the sub-bead 141 at which the lower surface of the sub-tank 130 and the bottom surface of the lower tank 120 are not brought into contact with each other, the joining of the sub-tank 130 becomes unstable, and in the secondary panel vibration mode to be a problem, the arrangement of beads becomes nonuniform, resulting in that a configuration in which a load is concentrated on specific spot-welded portions on one side (the spot-welded portions 150 between the bead 142 and the sub-bead 144) is provided, which causes a failure of the spot-welded portions. Therefore, it is suitable that the lower surface of the sub-tank 130 has no portion that is not brought into contact with the bottom surface part of the lower tank 120 except for the bead 142.

The fuel tank for the vehicle 100 according to the first embodiment of the present invention has been described as above. By forming the bead 142 continued in the longitudinal direction on approximately the center line of the lower tank width $W_L$ of the sub-tank 130, there is no chance that the rigidity is locally lowered, resulting in that the fatigue failure of the spot-welded portions 150 being the joint portions between the lower tank 120 and the sub-tank 130 caused by the vertical vibration during traveling of an automobile can be effectively prevented. Further, in that case, it is extremely effective that the beads in the different direction are not formed in the periphery of extension in the longitudinal direction of the bead 142, and the lower surface of the sub-tank 130 has no portion that is not brought into contact with the bottom surface part of the lower tank 120 except for the bead 142, in order to secure the rigidity and the failure strength.

Second Embodiment

Figure 25:
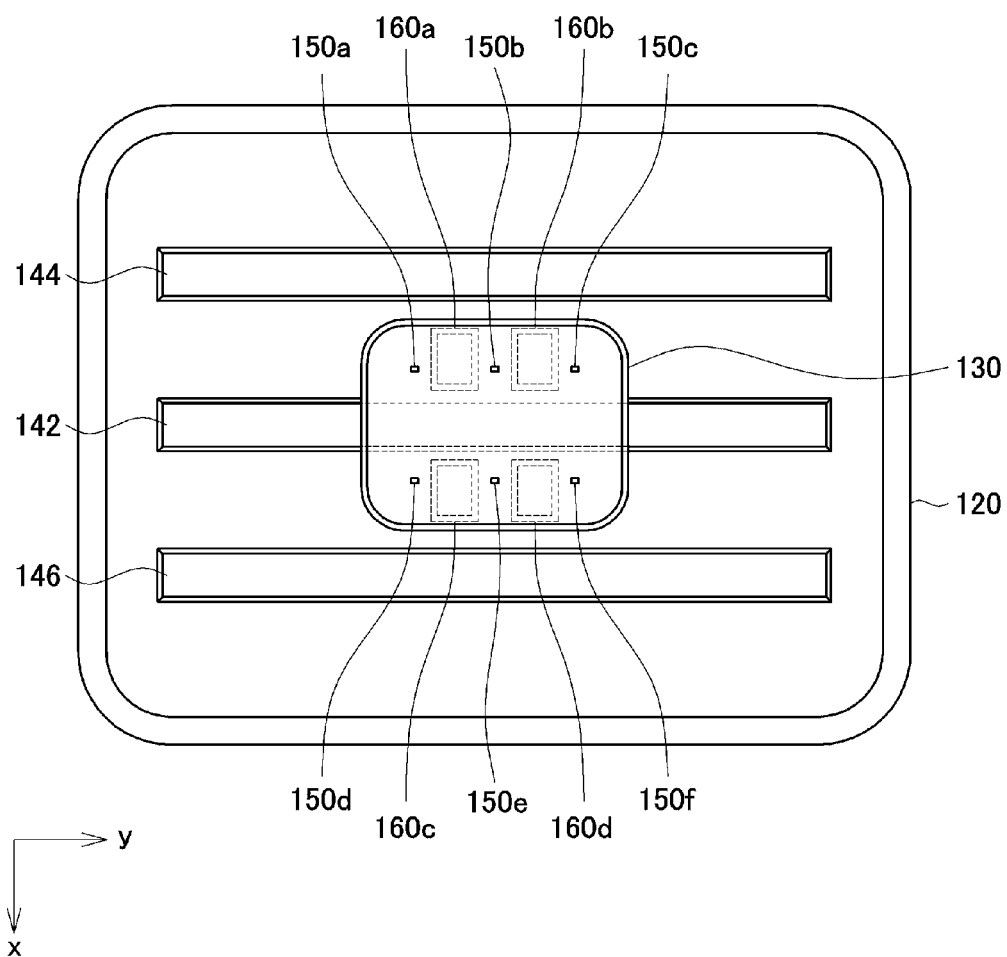
FIG. 25 is a plan view illustrating one configuration of a fuel tank according to a second embodiment of the present invention.

Next, a fuel tank for a vehicle 100 according to a second embodiment of the present invention will be described based on FIG. 25 and FIG. 26. Note that FIG. 25 is a plan view illustrating one configuration of the fuel tank 100 according to the present embodiment. FIG. 26 is a plan view illustrating another configuration of the fuel tank 100 according to the present embodiment.

In the fuel tank 100 according to the present embodiment, the bead 142 continued in the longitudinal direction is formed on approximately the center line of the lower tank width $W_L$ of the sub-tank 130 on the bottom surface part 124 of the lower tank 120, and embossed portions 160a to 160d are formed by embossing among spot-welded portions 150a to 150f at which the sub-tank 130 is fixed to the lower tank 120. The embossed portions 160a to 160d function in a similar manner to the sub-beads 144 and 146 formed on the bottom surface part 124 of the lower tank 120 of the fuel tank for the vehicle 100 according to the first embodiment, and are provided in an auxiliary manner to improve the rigidity in the secondary panel vibration mode of the fuel tank 100.

For example, it is set that the bead 142 extending continuously in the longitudinal direction on approximately the center line in the width direction of the sub-tank 130, and the sub-beads 144 and 146 adjacent to the bead 142 in the width direction, are formed on the bottom surface part 124 of the lower tank 120, as illustrated in FIG. 25. Further, the sub-tank 130 is fixed to the lower tank 120 by three spot-welded portions 150a to 150c and three spot-welded portions 150d to 150f on both sides of the bead 142. Further, in the lower tank 120 according to the present embodiment, four embossed portions 160a to 160d are formed among the spot-welded portions 150a to 150c and 150d to 150f within an installation area of the sub-tank 130.

The embossed portion 160a is formed between the spot-welded portions 150a and 150b, and the embossed portion 160b is formed between the spot-welded portions 150b and 150c. Further, the embossed portion 160c is formed between the spot-welded portions 150d and 150e, and the embossed portion 160d is formed between the spot-welded portions 150e and 150f. An embossed width in a width direction (x direction), an embossed length in a longitudinal direction (y direction), and an embossed depth in a depth direction (z direction) of each of these embossed portions 160a to 160d can be appropriately set. In an example illustrated in FIG. 25, the embossed width is set to a size smaller than an interval between the adjacent spot-welded portions and in which the embossing can be performed, and the embossed length is set so that the embossed portion is formed between an end face extending in the longitudinal direction of the bead 142 to an end face of the sub-tank 130. Further, the embossed depth can be set to the same depth as that of the bead 142, and the sub-beads 144 and 146, for example.

By forming the embossed portions 160a to 160d among the spot-welded portions 150a to 150f as described above, the natural frequency in the secondary panel vibration mode of the fuel tank 100 can be further improved, and the rigidity of the fuel tank 100 can be sufficiently maintained.

Further, as another example, it is also possible to form, on the bottom surface part 124 of the lower tank 120, the bead 142 that continues in the longitudinal direction on approximately the center line of the lower tank width $W_L$ of the sub-tank 130, and four embossed portions 160a to 160d provided among the spot-welded portions 150a to 150c, and 150d to 150f, as illustrated in FIG. 26. In the lower tank 120 of the present example, the sub-beads 144 and 146 are not formed on the bottom surface part 124 of the lower tank 120, compared to the shape of the lower tank 120 illustrated in FIG. 25. Accordingly, in order to suppress the reduction in the natural frequency in the secondary panel vibration mode of the fuel tank 100, the embossed width of each of the embossed portions 160a to 160d is enlarged, as illustrated in FIG. 26.

The embossed portion 160a is formed between the spot-welded portions 150a and 150b, and the embossed portion 160b is formed between the spot-welded portions 150b and 150c. Further, the embossed portion 160c is formed between the spot-welded portions 150d and 150e, and the embossed portion 160d is formed between the spot-welded portions 150e and 150f. These embossed portions 160a to 160d are formed in the width direction from the end face extending in the longitudinal direction of the bead 142 to the end of the R shape of the curved portion of the lower tank 120. Accordingly, even if the sub-beads 144 and 146 are not provided, the reduction in the rigidity at the spot-welded portions 150a, 150c, 150d and 150f can be prevented when the fuel tank 100 vibrates in the secondary panel vibration mode, resulting in that the fatigue failure of the spot-welded portions 150a to 150f can be prevented.

The fuel tank for the vehicle 100 according to the second embodiment of the present invention has been described as above. In the fuel tank 100 according to the present embodiment, there are formed, on the bottom surface part 124 of the lower tank 120, the bead 142 extending continuously in the longitudinal direction on approximately the center line in the width direction of the sub-tank 130, and the embossed portions 160a to 160d provided among the spot-welded portions 150a to 150c, and 150d to 150f. Accordingly, it is possible to suppress the reduction in the natural frequency in the secondary panel vibration mode of the fuel tank 100, and the fatigue failure of the spot-welded portions 150a to 150f can be effectively prevented.

Note that in the present embodiment, the shape of each of the embossed portions 160a to 160d is approximately a quadrangular shape, but, the present invention is not limited to such an example, and it is also possible to form the embossed portions 160a to 160d each having approximately a circular shape, for example.

The preferred embodiments of the present invention have been described in detail above with reference to the attached drawings, but, the present invention is not limited to such examples. It is apparent that a person having common knowledge in the technical field to which the present invention belongs is able to devise various variation or modification examples within the range of technical ideas described in the claims, and it should be understood that such examples belong to the technical scope of the present invention as a matter of course.

For example, in each of the above-described embodiments, each of the bead 142 and the sub-beads 144 and 146 is formed as a convex bead projecting toward the outside of the fuel tank 100, but, the present invention is not limited to such an example. For example, each of the beads may also be formed as a concave bead projecting toward the inner part of the fuel tank 100. The bead 124 of the lower tank 120 according to each of the above-described embodiments is formed as a convex bead formed by making the bottom surface part 142 project toward a negative direction of z-axis from an inner space in which the sub-tank 130 is provided, as illustrated in FIG. 27. At this time, the sub-tank 130 is spot-welded to the lower tank 120 at a flat portion on both sides of the bead 142.

Meanwhile, as illustrated in FIG. 28, for example, areas of the lower tank 120 corresponding to both sides of approximately the center line in the width direction of the sub-tank 130 are projected to the inner space side of the lower tank 120, to thereby form convex line portions 142a and 142b. Each flat surface on the inner space side of each of the line portions 142a and 142b is utilized as a flat area required for spot-welding the sub-tank 130 to the lower tank 120. Further, by forming the line portions 142a and 142b, there is formed a convex bead 142 projected in the negative direction of z-axis from the flat surfaces of the line portions 142a and 142b, as illustrated in FIG. 28.

Note that the sub-beads 144 and 146, and the embossed portions 160a to 160d formed on the bottom surface part 124 of the lower tank 120 can be formed in a convex shape or a concave shape.

Further, in each of the above-described embodiments, the sub-beads 144 and 146 are formed on both sides of the bead 142, but, the present invention is not limited to such an example, and it is also possible to form one or a plurality of sub-bead(s) on the bottom surface part 124 of the lower tank 120. The sub-bead is formed continuously in the longitudinal direction of the fuel tank 100 to be approximately parallel to the bead 142, as described in the above-described embodiments.

Further, in each of the above-described embodiments, the sub-tank 130 is fixed to the lower tank 120 by the six spot-welded portions 150a to 150f, but, the present invention is not limited to such an example. The number and the welded positions of the spot-welded portions 150 can be appropriately determined in accordance with the size of the sub-tank 130 with respect to the lower tank 120, and the like.

Figure 29:
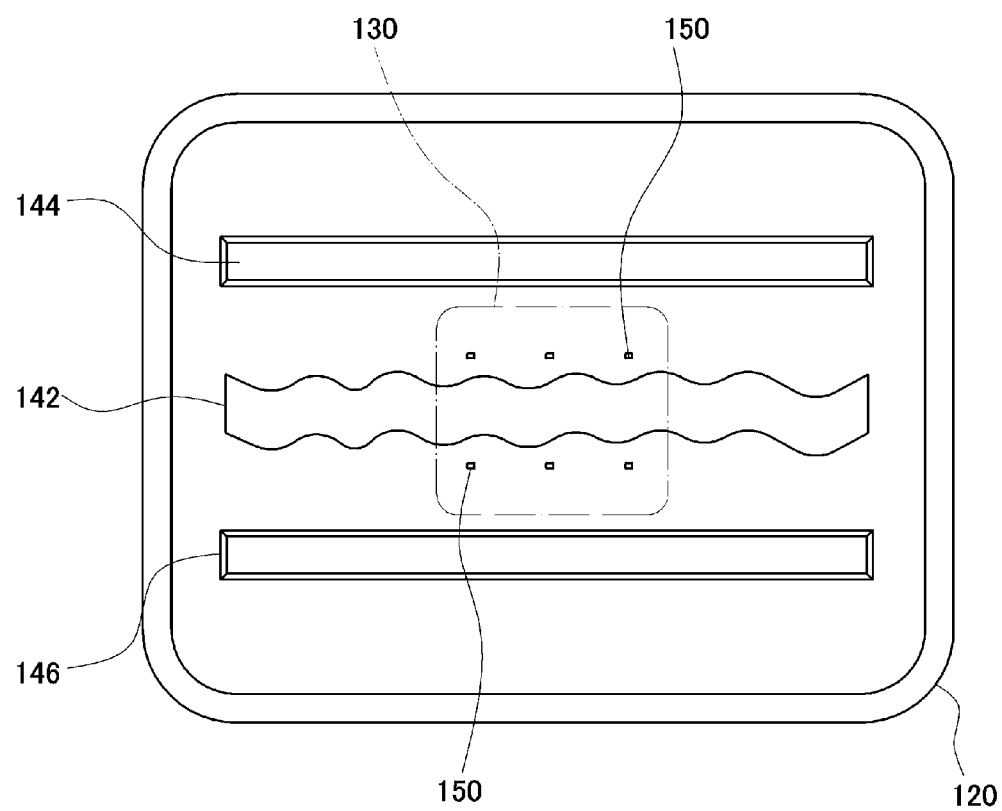
FIG. 29 is a plan view of a lower tank having a meandering bead, as a modified example of the present invention.

Further, although each of the above-described embodiments is explained using an example of illustration in which each of the bead 142 and the sub-beads 144 and 146 formed on both sides of the bead 142 exhibits a linear shape (refer to FIG. 3 and the like), it is also possible that the bead 142 is meandered in the width direction within a range of interval between the spot-welded portions 150 in the width direction (x direction) of the sub-tank 130 as illustrated in FIG. 29, for example.

Alternatively, it is also possible to change the width of the bead 142 within the range of interval between the spot-welded portions 150 in the width direction of the sub-tank 130 as illustrated in FIG. 30.

Here, there is a case where supporting members for piping, a baffle plate and the like are collaterally attached to the inner part of the fuel tank 100 by spot welding. In such a case, if no measure is taken, the spot-welded portions 150 formed by the spot welding and the bead 142 sometimes interfere with each other. In order to avoid the interference, it is effective to employ the shape of bead in which the bead is meandered or the width of the bead is changed as described above (the meandering bead or the width-changed bead).

Note that when a range of meandering of the meandering bead or a change width of the width-changed bead falls within the range of interval between the spot-welded portions 150, the reduction in the natural frequency can be suppressed to about 10%, compared to the linear bead, and the sufficient rigidity is maintained.

Further, although an example in which the bead 142 is formed on the bottom surface part 124 of the lower tank 120 is described, it is also possible to form the bead as a bead 142A formed continuously from the bottom surface part 124 to the sidewall part 122, as additionally illustrated in FIG. 2.

By extending the bead 142A to the area of the sidewall part 122 as described above, a three-dimensional structure is constructed by the bead 142A along the bottom surface part 124 and the sidewall part 122, and accordingly, the rigidity as a whole can be increased.

INDUSTRIAL APPLICABILITY

According to the present invention, a fuel tank for a vehicle capable of increasing a rigidity of a fuel tank, capable of effectively preventing a fatigue failure of welded portions between a sub-tank and a lower tank caused by a vertical vibration during traveling of a vehicle, and having extremely excellent durability, reliability and the like, is realized.

The invention claimed is:

1. A fuel tank for a vehicle, comprising:
a tank main body in which an upper tank and a lower tank are mutually joined to form a closed space in which fuel is housed; and
a sub-tank fixed to a bottom surface part of the lower tank by spot welding, wherein:
the lower tank consists of the bottom surface part, a sidewall part and a curved portion having an R shape as a joint portion between the bottom surface part and the sidewall part;
a plurality of rows of the spot welding are set along a longitudinal direction of the lower tank with an interval therebetween in a width direction of said sub-tank;
a bead positioned between the rows of the spot welding and extending continuously along the longitudinal direction of the lower tank is formed on the bottom surface part of the lower tank; and
the bead is formed as a convex bead projecting toward an outside of the fuel tank; wherein
a length of the bead projecting toward the outside of the fuel tank is set to a length being 80% or more of a length of a flat portion of the bottom surface part of the lower tank in the longitudinal direction,
a width of the bead projecting toward the outside of the fuel tank is set to a length of being 50% or more of the interval of two rows of the spot welding which are adjacent with the bead therebetween,
the bead projecting toward the outside of the fuel tank has no discontinuous portion and extends continuously, and no other bead is formed on an extension in the longitudinal direction of the bead including the sidewall part and the curved portion,
a pair of sub-beads disposed on both sides of the bead projecting toward the outside of the fuel tank are formed on a flat portion from an end face of the sub-tank to an end of the R shape of the curved portion of the lower tank in the width direction of the lower tank,
a lower surface of said sub-tank has no portion that is not brought into contact with the bottom surface part of the lower tank on an outside of the two rows of the spot welding except for the bead projecting toward the outside of the fuel tank between the two rows of the spot welding,
the lower tank has a vibration mode in which spot-weld portions on the bottom surface part thereof are set to antinodes and nodes in the longitudinal direction, and
compared to a first reference natural frequency as a natural frequency when the length of the bead projecting toward the outside of the fuel tank between the two rows of the spot welding is the length of the flat portion of the bottom surface part, a reduction in a natural frequency in a secondary panel vibration mode is suppressed to 10% at the maximum.

2. The fuel tank for the vehicle according to claim 1, wherein
the bead is formed continuously from the bottom surface part to the sidewall part of the lower tank.

3. The fuel tank for the vehicle according to claim 1, wherein
the plurality of rows of the spot welding are disposed to be symmetric with respect to the bead formed on approximately a center line in the width direction of said sub-tank.

4. The fuel tank for the vehicle according to claim 3, wherein
each of embossed portions formed in a vertical direction with respect to the bottom surface part of the lower tank is provided between portions formed by the spot welding and adjacent in the row direction.

5. The fuel tank for the vehicle according to claim 3, wherein
the bead is formed as a meandering bead meandering in the width direction or a width-changed bead whose width is changed.

6. The fuel tank for the vehicle according to claim 1, wherein
another bead is formed on a flat portion between an end face in the width direction of said sub-tank to the sidewall part of the lower tank, on the bottom surface part of the lower tank along the longitudinal direction of the lower tank.

7. The fuel tank for the vehicle according to claim 1, wherein:
said tank main body and said sub-tank are made of at least any one of materials of a surface treated steel sheet, a stainless steel, and an aluminum alloy;
the lower tank is formed of a material; and
said sub-tank is also formed of the material.

* * * * *